US011200700B2

(12) United States Patent
Wang et al.

(10) Patent No.: US 11,200,700 B2
(45) Date of Patent: Dec. 14, 2021

(54) METHODS AND APPARATUS FOR SIGNALING VIEWPORTS AND REGIONS OF INTEREST FOR POINT CLOUD MULTIMEDIA DATA

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/738,387

(22) Filed: Jan. 9, 2020

(65) Prior Publication Data
US 2020/0226792 A1 Jul. 16, 2020

Related U.S. Application Data

(60) Provisional application No. 62/790,600, filed on Jan. 10, 2019.

(51) Int. Cl.
*G06T 7/00* (2017.01)
*G06T 9/00* (2006.01)
*G06T 3/40* (2006.01)

(52) U.S. Cl.
CPC ............... *G06T 9/00* (2013.01); *G06T 3/40* (2013.01); *G06T 7/0002* (2013.01); *G06T 2207/10016* (2013.01); *G06T 2207/10028* (2013.01)

(58) Field of Classification Search
CPC .. H04N 19/597; H04N 21/816; H04N 13/117; G06T 9/00; G06T 19/003; G06K 9/3233
See application file for complete search history.

(56) References Cited

U.S. PATENT DOCUMENTS

| 10,553,015 B2* | 2/2020 | Hemmer ............... G06T 15/205 |
| 2008/0247636 A1* | 10/2008 | Davis .................... G06T 19/00 |
| | | 382/152 |
| 2017/0236024 A1 | 8/2017 | Wang et al. |
| 2017/0347122 A1 | 11/2017 | Chou et al. |

(Continued)

OTHER PUBLICATIONS

M. Wien, J. M. Boyce, T. Stockhammer and W. Peng, "Standardization Status of Immersive Video Coding," in IEEE Journal on Emerging and Selected Topics in Circuits and Systems, vol. 9, No. 1, pp. 5-17, Mar. 2019, doi: 10.1109/JETCAS.2019.2898948. (Year: 2019).*

(Continued)

*Primary Examiner* — Li Liu
(74) *Attorney, Agent, or Firm* — Wolf, Greenfield & Sacks, P.C.

(57) ABSTRACT

The techniques described herein relate to methods, apparatus, and computer readable media configured to encode and/or decode video data. Point cloud video data is received that includes metadata specifying one or more regions of interest of the point cloud video data. A first region of interest is determined from the one or more regions of interest. A portion of the point cloud video data associated with the first region of interest is determined. Point cloud media is generated for viewing by a user based on the determined portion of the point cloud video data associated with the first region of interest.

19 Claims, 23 Drawing Sheets

(56) References Cited

U.S. PATENT DOCUMENTS

| | | | | |
|---|---|---|---|---|
| 2019/0068949 | A1* | 2/2019 | Wang | H04N 19/70 |
| 2019/0114830 | A1* | 4/2019 | Bouazizi | H04N 13/388 |
| 2019/0318488 | A1* | 10/2019 | Lim | G06K 9/00208 |
| 2020/0014907 | A1* | 1/2020 | Lee | H04N 13/178 |
| 2020/0204782 | A1* | 6/2020 | Najaf-Zadeh | H04N 19/593 |
| 2020/0228780 | A1* | 7/2020 | Kim | H04N 21/6587 |
| 2021/0049779 | A1* | 2/2021 | Harviainen | G06T 7/38 |

OTHER PUBLICATIONS

Schwarz, Sebastian, et al. "Emerging MPEG standards for point cloud compression." IEEE Journal on Emerging and Selected Topics in Circuits and Systems 9.1 (2018): 133-148. (Year: 2018).*
[No Author Listed], First idea on Systems technologies for Point Cloud Coding. International Organisation for Standardisation, Coding of Moving Pictures and Audio, ISO/IEC JTC1/SC29/WG11 MPEG2018/w17675. Apr. 2018: 6 pages.
[No Author Listed], Information technology—Coded representation of immersive media (MPEG-I)—Part 8: Network Based Media Processing. ISO/IEC JTC1/SC29/WG11. ISO 23090-8:2018(E). 2018: 47 pages.
[No Author Listed], Information technology—Coding of audio-visual objects—Part 12: ISO base media file format. ISO/IEC 14496-12:2015(E). Feb. 20, 2015: 256 pages.
[No Author Listed], Information technology—MPEG systems technologies—Part 10: Carriage of times metadata metrics in ISO base media file format. ISO/IEC 23001-10:2019(E). Jun. 13, 2019: 28 pages.
Mammou et al., Second Working draft for Video-based Point Cloud Coding. International Organization for Standardization, Coding of Moving Pictures and Audio, ISO/IEC JTC1/SC29/WG11 MPEG2018/N17771. Jul. 2018: 45 pages.
Preda, Point Cloud Compression in MPEG. institut Mines Telecom. MP20 Workshop. Hong-Kong. Oct. 2017: 22 pages.
Singer et al., Technologies under Consideration for ISOBMFF. International Organisation for Standardisation, Coding of Moving Pictures and Audio, ISO/IEC JTC1/SC29/WG11 MPEG2018/N17575. Apr. 2018: 57 pages.
Takahashi et al., On encapsulation of V-PCC bitstream in single ISOBMFF track. International Organisation for Standardisation, Coding of Moving Pictures and Audio, ISO/IEC JTC1/SC29/WG11 MPEG2018/M45100. Oct. 2018: 2 pages.
Wang et al., Media Processing related Track Derivations in ISOBMFF. International Organisation for Standardisation, Coding of Moving Pictures and Audio, ISO/IEC JTC1/SC29/WG11 MPEG2016/M44800. Oct. 2018: 16 pages.
Wang et al., Signalling Rectangular and Spherical Regions in 2D and 3D Coordinate Systems for VR Media Content in Timed Metadata Tracks. International Organisation for Standardisation, Coding of Moving Pictures and Audio, ISO/IEC JTC1/SC29/WG11 M42509. Apr. 2018: 12 pages.
Yip et al., WD of Storage of V-PCC in ISOBMFF Files. International Organisation for Standardisation, Coding of Moving Pictures and Audio, ISO/IEC JTC1/SC29/WG11 N18059. Oct. 2018: 7 pages.

* cited by examiner

```
aligned(8) class 2DCartesianCoordinatesSampleEntry     502
  extends MetadataSampleEntry ('2dcc') {     504
  unsigned int(16) reference_width;     506
  unsigned int(16) reference_height;     508
  bit(6) reserved = 0;
  unsigned int(1) dynamic_location_flag;     510
  unsigned int(1) dynamic_size_flag;
  if (dynamic_location_flag == 0) {
    unsigned int(16) static_top_left_x;     512
    unsigned int(16) static_top_left_y;     514
  }
  if (dynamic_size_flag == 0) {
    unsigned int(16) static_width;     516
    unsigned int(16) static_height;     518
  }
}
```

FIG. 5A

```
aligned(8) class 2DCartesianCoordinatesSample() {
    if (dynamic_location_flag) {          ← 508
        unsigned int(16) top_left_x;      ← 552
        unsigned int(16) top_left_y;      ← 554
    }
    if (dynamic_size_flag) {              ← 510
        unsigned int(16) width;           ← 556
        unsigned int(16) height;          ← 558
    }
    unsigned int(1) interpolate;          ← 560
    unsigned int(7) reserved;
}
```

```
aligned(8) class 6DSphericalCoordinatesSampleEntry extends MetadataSampleEntry ('6dsc') {
    unsigned int(8) shape_type; ← 702
    bit(5) reserved = 0;
    unsigned int(1) dynamic_location_flag; ← 704
    unsigned int(1) dynamic_orientation_flag; ← 706
    unsigned int(1) dynamic_range_flag; ← 708
    unsigned int(1) unit_sphere_flag = 1; ← 710
    if (dynamic_location_flag == 0) {
        signed int(32) static_centre_x; ← 712
        signed int(32) static_centre_y; ← 714
        singed int(32) static_centre_z; ← 716
    }
    if (dynamic_orientation_flag == 0) {
        signed int(32) static_centre_azimuth; ← 718
        signed int(32) static_centre_elevation; ← 720
        singed int(32) static_centre_tilt; ← 722
    }
    if (dynamic_range_flag == 0) {
        unsigned int(32) static_azimuth_range; ← 724
        unsigned int(32) static_elevation_range; ← 726
    }
    if (unit_sphere_flag == 0) {
        unsigned int(32) sphere_radius; ← 728
    }
}
```

FIG. 7

```
aligned(8) class 6DSphericalCoordinatesSample(){
    if (dynamic_location_flag) {
        signed int(32) centre_x;        // 802
        signed int(32) centre_y;        // 804
        singed int(32) centre_z;        // 806
    }
    if (dynamic_orientation_flag) {
        signed int(32) centre_azimuth;   // 808
        signed int(32) centre_elevation; // 810
        singed int(32) centre_tilt;      // 812
    }
    if (dynamic_range_flag) {
        unsigned int(32) azimuth_range;   // 814
        unsigned int(32) elevation_range; // 816
    }
    unsigned int(1) interpolate;  // 818
    unsigned int(7) reserved;
}
```

FIG. 8

```
aligned(8) class 6DCartesianCoordinatesSampleEntry extends MetadataSampleEntry ('6dcc') {
    unsigned int(8) shape_type;  ←——— 1002
    bit(4) reserved = 0;
    unsigned int(1) dynamic_location_flag;  ←——— 1004
    unsigned int(1) dynamic_orientation_flag;  ←——— 1006
    unsigned int(1) dynamic_range_flag;  ←——— 1008
    unsigned int(1) unit_sphere_flag = 1;  ←——— 1010
    if (dynamic_location_flag == 0) {
        signed int(32) static_centre_x;  ←——— 1012
        signed int(32) static_centre_y;  ←——— 1014
        singed int(32) static_centre_z;  ←——— 1016
    }
    if (dynamic_orientation_flag == 0) {
        signed int(32) static_centre_azimuth;  ←——— 1018
        signed int(32) static_centre_elevation;  ←——— 1020
        singed int(32) static_centre_tilt;  ←——— 1022
    }
    if (dynamic_range_flag == 0) {
        unsigned int(32) static_width_range;  ←——— 1024
        unsigned int(32) static_height_range;  ←——— 1026
    }
    if (unit_sphere_flag == 0) {
        unsigned int(32) sphere_radius;  ←——— 1028
    }
}
```

```
aligned(8) class 6DCartesianCoordinatesSample() {
    if (dynamic_location_flag) {
        signed int(32) centre_x;         ← 1102
        signed int(32) centre_y;         ← 1104
        singed int(32) centre_z;         ← 1106
    }
    if (dynamic_orientation_flag) {
        signed int(32) centre_azimuth;   ← 1108
        signed int(32) centre_elevation; ← 1110
        singed int(32) centre_tilt;      ← 1112
    }
    if (dynamic_size_flag) {
        unsigned int(32) width_range;    ← 1114
        unsigned int(32) height_range;   ← 1116
    }
    unsigned int(1) interpolate;         ← 1118
    unsigned int(7) reserved;
}
```

```
aligned(8) class 3DV-PCCViewportSampleEntry
extends 6DSphericalCoordinatesSampleEntry('3pcv') {    ← 1406
    unsigned int(32)  geometry_track_ID;               ← 1408
    unsigned int(32)  texture_track_ID;
}
```

```
aligned(8) class 2DV-PCCViewportSampleEntry
extends 6DCartesianCoordinatesSampleEntry('2pcv') {
    bit(1) multiple_geometry_flag;         ← 1502
    bit(1) multiple_texture_flag;          ← 1504
    bit(6) reserved = 0;
    if (multiple_geometry_flag)
        unsigned int(32)  geometry_track_ID;   ← 1506
    if (multiple_texture_flag)
        unsigned int(32)  texture_track_ID;    ← 1508
}
```

FIG. 15A

```
aligned(8) class 2DV-PCCViewportSampleEntry
extends 6DCartesianCoordinatesSampleEntry('2pcv') {
    unsigned int(32)    geometry_track_ID;   ← 1552
    unsigned int(32)    texture_track_ID;    ← 1554
}
```

FIG. 15B

```
aligned(8) class 6DSphericalCoordinatesSampleEntry extends MetadataSampleEntry ('6dsc') {
    unsigned int(8) number_of_regions;  ←—— 1802
    for (i = 0; i < number_of_regions; i++) {  ←—— 1804
        unsigned int(8) shape_type;
        bit(5) reserved = 0;
        unsigned int(1) dynamic_location_flag;
        unsigned int(1) dynamic_orientation_flag;
        unsigned int(1) dynamic_range_flag;
        unsigned int(1) unit_sphere_flag = 1;
        if (dynamic_location_flag == 0) {
            signed int(32) static_centre_x;
            signed int(32) static_centre_y;
            singed int(32) static_centre_z;}
        if (dynamic_orientation_flag == 0) {
            signed int(32) static_centre_azimuth;
            signed int(32) static_centre_elevation;
            singed int(32) static_centre_tilt;}
        if (dynamic_range_flag == 0) {
            unsigned int(32) static_azimuth_range;
            unsigned int(32) static_elevation_range;}
        if (unit_sphere_flag == 0) {
            unsigned int(32) sphere_radius;
    }
}
```

```
aligned(8) class 6DSphericalCoordinatesSample(){
    for (i = 0; i < number_of_regions; i++) {  ←——— 1902
        if(dynamic_location_flag) {
            signed int(32) centre_x;
            signed int(32) centre_y;
            singed int(32) centre_z;
        }
        if(dynamic_orientation_flag) {
            signed int(32) centre_azimuth;
            signed int(32) centre_elevation;
            singed int(32) centre_tilt;
        }
        if(dynamic_range_flag) {
            unsigned int(32) azimuth_range;
            unsigned int(32) elevation_range;
        }
        unsigned int(1) interpolate;
        unsigned int(7) reserved;
    }
}
```

METHODS AND APPARATUS FOR SIGNALING VIEWPORTS AND REGIONS OF INTEREST FOR POINT CLOUD MULTIMEDIA DATA

RELATED APPLICATIONS

This Application claims priority under 35 U.S.C. § 119(e) to U.S. Provisional Application Ser. No. 62/790,600, filed Jan. 10, 2019, entitled "METHODS OF TIMED METADATA FOR (RECOMMENDED) VIEWPORTS OF V-PCC CONTENT IN ISOBMFF", which is herein incorporated by reference in its entirety.

TECHNICAL FIELD

The techniques described herein relate generally to video coding, and particularly to viewports and/or regions of interest in point cloud video content, including signaling rectangular and spherical regions in two-dimensional (2D), three-dimensional (3D), and/or six-dimensional (6D) coordinate systems for video content.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for representing rectangular and spherical regions of interest (ROIs) in point cloud video content, including in video-based point cloud compression.

Some embodiments relate to a decoding method for decoding video data. The method includes receiving point cloud video data comprising metadata specifying one or more regions of interest of the point cloud video data, determining a first region of interest from the one or more regions of interest, determining a portion of the point cloud video data associated with the first region of interest, and generating, based on the determined portion of the point cloud video data associated with the first region of interest, point cloud media for viewing by a user.

In some examples, receiving the point cloud video data includes receiving a set of two-dimensional (2D) planar video bit streams and second metadata specifying a conversion of the set of 2D planar video bit streams to 3D volumetric media, and determining the portion of the point cloud video data associated with the first region of interest includes determining a subset of data of the set of 2D planar video bit streams associated with the first region of interest.

In some examples, the method includes receiving user interaction data associated with the point cloud video data, wherein the user interaction data comprises data indicative of the user's location, the user's viewpoint, or some combination thereof, determining a second region of interest from the one or more regions of interest, wherein the second region of interest is different than the first region of interest, determining a second portion of the point cloud video data associated with the second region of interest, wherein the second portion is different than the portion associated with the first region of interest, and generating, based on the determined second portion of the point cloud video data associated with the second region of interest, second point cloud media for viewing by the user.

In some examples, determining the first region of interest includes determining a first identifier for a geometry track of the point cloud video data, a second identifier for a texture track of the point cloud video data, or both, wherein the geometry track specifies one or more geometric aspects of the point cloud video data, and the texture track specifies one or more texture aspects of the point cloud video data, and determining the portion of the point cloud video data associated with the first region of interest includes selecting the geometry track identified by the first identifier, selecting the texture track identified by the second identifier, or both.

In some examples, the method further includes determining a region structure associated with the point cloud video data that specifies one or more aspects of the region of interest based on a sphere, wherein the one or more aspects comprise a location of the first region of interest, an orientation of the first region of interest, a shape of the first region of interest, a size range of the first region of interest, or some combination thereof, the region structure including data indicative of whether the one or more aspects of the region structure comprises data indicative of one or more global aspects of the region of interest that applies to each of a set of samples associated with the region structure, and determining the first region of interest in the point cloud video data based on the data indicative of whether the region structure comprises data indicative of the one or more global aspects of the first region of interest.

In some examples, determining the first region of interest in the point cloud video data based on the data indicative of whether the region structure comprises data indicative of one or more global aspects of the region of interest includes determining the region structure that does not specify at least one global aspect of the one or more aspects, and determining, for each sample associated with the region structure, a sample-specific aspect for the sample for the first region of interest.

In some examples, determining the first region of interest in the point cloud video data includes determining the location of the first region of interest by determining a center location of the first region of interest.

In some examples, determining the first region of interest in the point cloud video data includes determining the orientation of the first region of interest by determining a center azimuth, a center elevation, and a center tilt of the first region of interest.

In some examples, determining the first region of interest in the point cloud video data includes determining the size range of the first region of interest by determining an azimuth range and an elevation range of the first region of interest.

Some embodiments relate to a method for encoding video data. The method includes encoding point cloud video data comprising metadata specifying one or more regions of interest of the point cloud video data, including determining a first region of interest of the one or more regions of interest, determining a portion of the point cloud video data associated with the first region of interest, and encoding, based on the determined portion of the point cloud video data associated with the first region of interest, the point cloud video data comprising encoding the metadata specifying the one or more regions of interest of the point cloud video data.

Some embodiments relate to an apparatus configured to decode video data. The apparatus includes a processor in communication with memory. The processor is configured to execute instructions stored in the memory that cause the processor to perform receiving point cloud video data comprising metadata specifying one or more regions of interest of the point cloud video data, determining a first region of interest from the one or more regions of interest, determining a portion of the point cloud video data associated with the first region of interest, and generating, based on the determined portion of the point cloud video data associated with the first region of interest, point cloud media for viewing by a user.

In some examples, receiving the point cloud video data includes receiving a set of two-dimensional (2D) planar video bit streams and second metadata specifying a conversion of the set of 2D planar video bit streams to 3D volumetric media, and determining the portion of the point cloud video data associated with the first region of interest comprises determining a subset of data of the set of 2D planar video bit streams associated with the first region of interest.

In some examples, the instructions further cause the processor to perform receiving user interaction data associated with the point cloud video data, wherein the user interaction data comprises data indicative of the user's location, the user's viewpoint, or some combination thereof, determining a second region of interest from the one or more regions of interest, wherein the second region of interest is different than the first region of interest, determining a second portion of the point cloud video data associated with the second region of interest, wherein the second portion is different than the portion associated with the first region of interest, and generating, based on the determined second portion of the point cloud video data associated with the second region of interest, second point cloud media for viewing by the user.

In some examples, determining the first region of interest includes determining a first identifier for a geometry track of the point cloud video data, a second identifier for a texture track of the point cloud video data, or both, wherein the geometry track specifies one or more geometric aspects of the point cloud video data, and the texture track specifies one or more texture aspects of the point cloud video data, and determining the portion of the point cloud video data associated with the first region of interest includes selecting the geometry track identified by the first identifier, selecting the texture track identified by the second identifier, or both.

In some examples, the instructions further cause the processor to perform determining a region structure associated with the point cloud video data that specifies one or more aspects of the region of interest based on a sphere, wherein the one or more aspects comprise a location of the first region of interest, an orientation of the first region of interest, a shape of the first region of interest, a size range of the first region of interest, or some combination thereof, the region structure including data indicative of whether the one or more aspects of the region structure comprises data indicative of one or more global aspects of the region of interest that applies to each of a set of samples associated with the region structure, and determining the first region of interest in the point cloud video data based on the data indicative of whether the region structure comprises data indicative of the one or more global aspects of the first region of interest.

In some examples, determining the first region of interest in the point cloud video data based on the data indicative of whether the region structure comprises data indicative of one or more global aspects of the region of interest includes determining the region structure that does not specify at least one global aspect of the one or more aspects, and determining, for each sample associated with the region structure, a sample-specific aspect for the sample for the first region of interest.

In some examples, determining the first region of interest in the point cloud video data includes determining the location of the first region of interest by determining a center location of the first region of interest.

In some examples, determining the first region of interest in the point cloud video data includes determining the orientation of the first region of interest by determining a center azimuth, a center elevation, and a center tilt of the first region of interest.

In some examples, determining the first region of interest in the point cloud video data includes determining the size range of the first region of interest by determining an azimuth range and an elevation range of the first region of interest.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 5A shows an exemplary syntax for a two-dimensional Cartesian coordinate sample entry, according to some embodiments.

FIG. 5B shows an exemplary 2D Cartesian coordinates sample, according to some embodiments.

FIG. 7 shows an exemplary syntax for a 6D spherical coordinates sample entry, according to some embodiments.

FIG. 8 shows an exemplary syntax for a 6D spherical coordinates sample, according to some embodiments.

FIG. 10 is an exemplary syntax for a 6D Cartesian coordinates sample entry, according to some embodiments.

FIG. 11 shows an exemplary syntax for a 6D Cartesian coordinates sample, according to some embodiments.

FIG. 15A shows an exemplary 2D V-PCC viewport sample entry, according to some embodiments.

FIG. 15B shows another exemplary 2D V-PCC viewport sample entry, according to some embodiments.

FIG. 18 an exemplary syntax for expanding the 6D spherical coordinates sample entry of FIG. 7 to specify one or more regions of interest, according to some embodiments.

FIG. 19 shows an exemplary syntax for expanding the 6D spherical coordinates sample of FIG. 8 to specify one or more regions of interest, according to some embodiments.

DETAILED DESCRIPTION OF INVENTION

Point cloud data, such as Video-based Point Cloud Compression (V-PCC) data can provide for compressed point cloud data that can be used for various types of 3D multimedia applications. The inventors have appreciated that it is desirable to control what point cloud data is rendered and/or displayed based on user interaction with the point cloud data. For example, it can be desirable to only process and display point cloud content that will be viewed by the user (e.g., to avoid processing content that will not be displayed). User interaction information can allow a user to select different viewports, which can in turn be used to signal to devices which point cloud data to process accordingly. For example, user interaction information can be used to allow a user to select different viewpoints in the point cloud data, and to change the point cloud data processing based on such user selection/interaction. Therefore, the inventors have appreciated that viewports need to be specified for point cloud data, including to provide recommended viewports and to facilitate user interaction with the point cloud data (e.g., including to change viewports and to adjust the point cloud data processing accordingly).

The inventors have further appreciated that because point cloud data can include a plurality of different types of tracks (e.g., a plurality of geometry tracks and/or texture tracks), it is desirable to associate a viewport with specific tracks (e.g., with specific geometry and/or texture tracks). The techniques described herein provide for signaling point cloud viewports, including for V-PCC content. The viewports can be specified for specific point cloud tracks, such as for specific geometry and/or texture tracks. The V-PCC content can be carried in ISOBMFF files, and the techniques can signal the viewports as timed metadata tracks, including as a type of user interaction information. In some embodiments, the viewport can be a 3D spherical region, a 2D planar region, and/or the like in 3D space with six degrees of freedom (6 DoF). The techniques provide for specifying 6D coordinates, including 6D spherical and 6D Cartesian coordinates, and using such 6D coordinates to specify 2D and 3D viewports.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
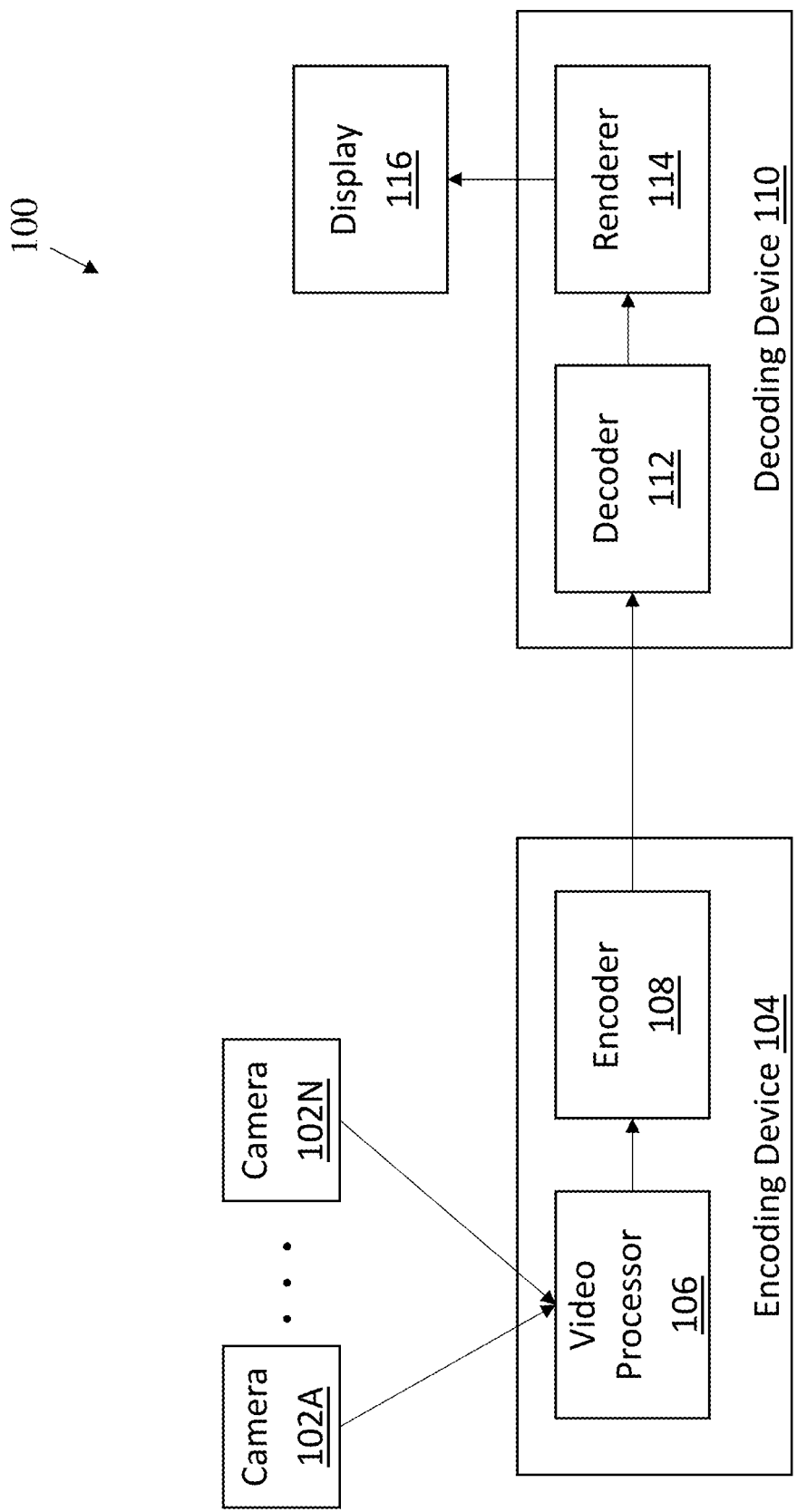
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
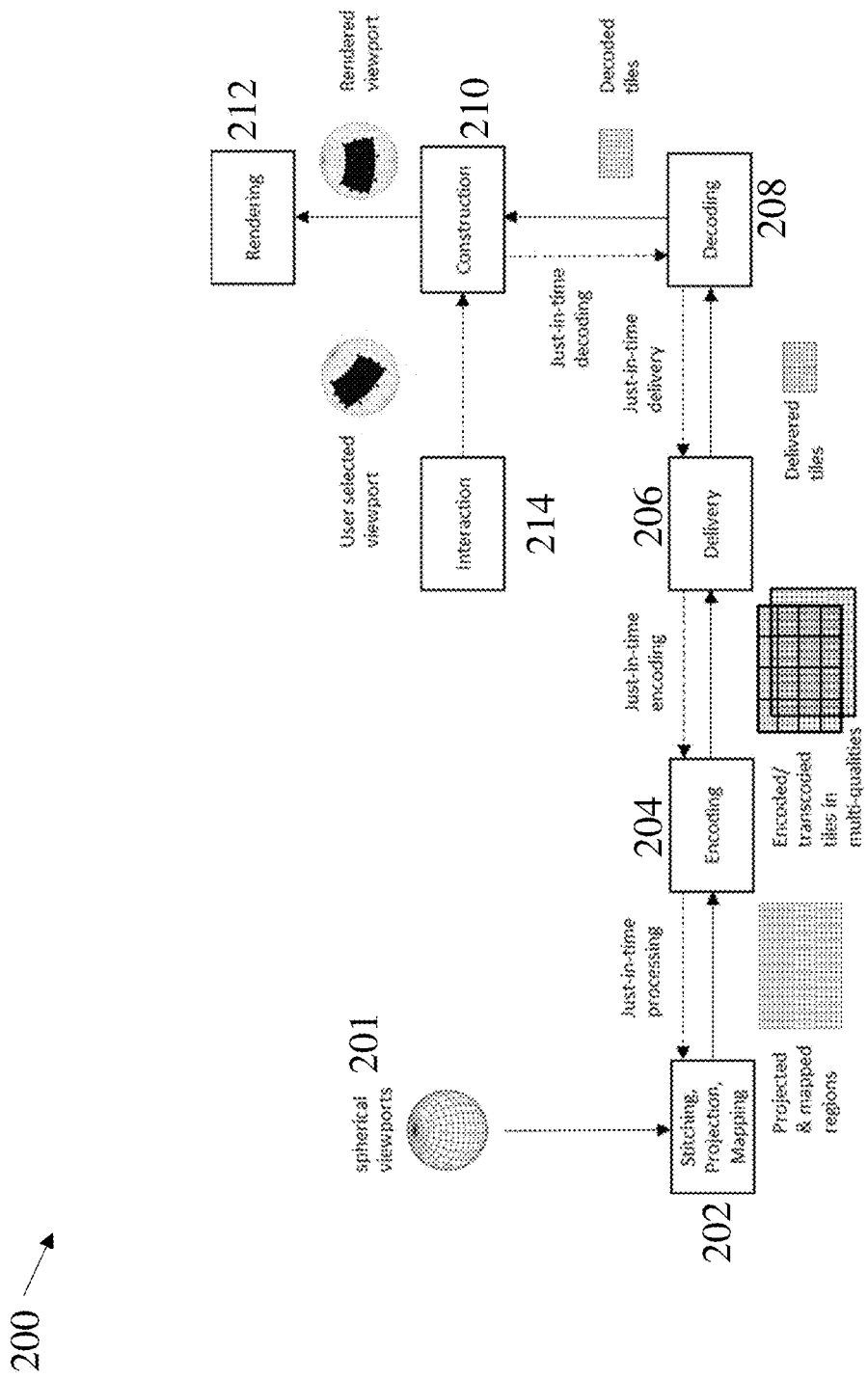
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191, also ISO/IEC 23001-10:2015), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w10225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content).

Additional attributes like quality and rate ranking of the region can also be added, as discussed further herein.

Figure 3B:
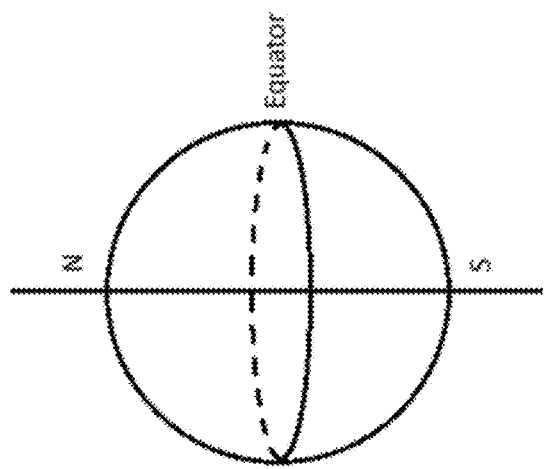
FIG. 3B shows the north (N) and south (S) poles of a sphere, according to some examples.
Figure 3A:
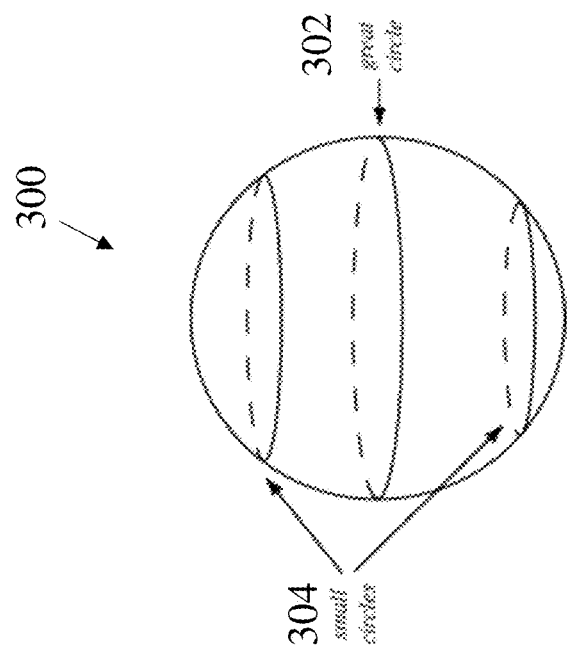
FIG. 3A shows a sphere with one great circle and two small circles, according to some examples.

In some embodiments, in order to specify the shape and size of an ROI on the sphere, certain spherical notions can be used. FIG. 3A shows a sphere 300 with one great circle 302 and two small circles 304. As shown, the great circle 302 spans the intersection of the spherical surface with a 2D plane (not shown) passing through the center of the sphere 300. Thus, the great circle 302 is a section of the sphere 300 that contains a diameter of the sphere 300. The small circles 304 show the intersection of the spherical surface with a 2D plane (not shown) that does not pass through the center of the sphere 300, and therefore each is associated with a section of the sphere 300 that does not contain a diameter of the sphere 300.

Figure 3C:
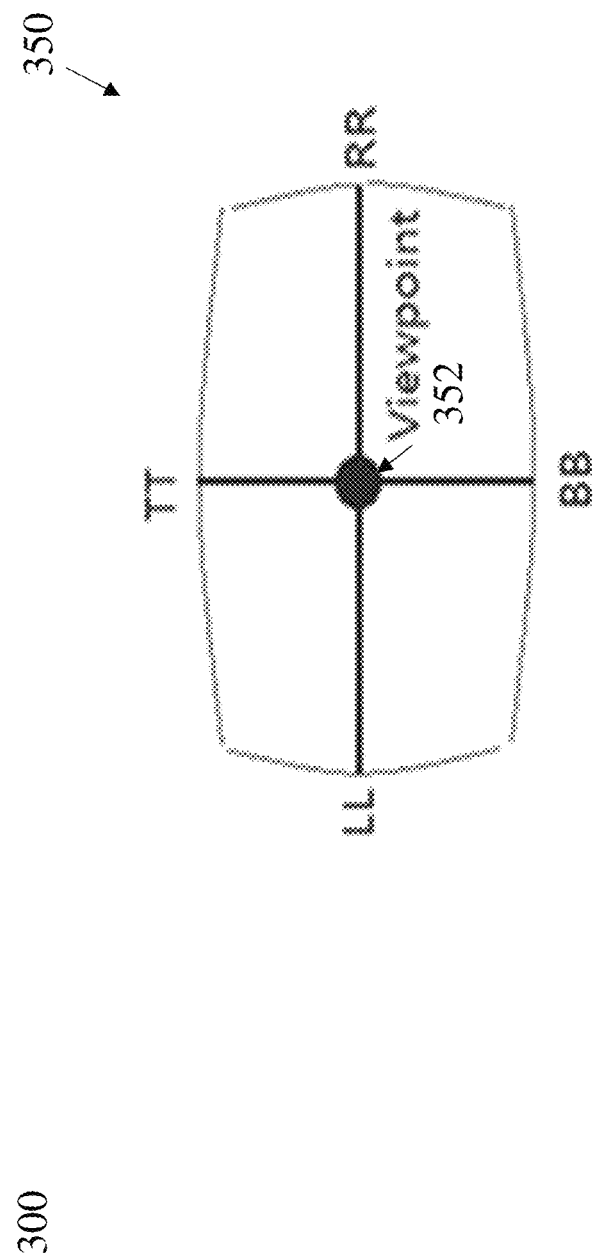
FIG. 3C shows an ROI with a generally rectangular shape, according to some embodiments.

There can be a number of different ways to join, or to connect using a line, two points on a sphere using great and/or small circles. Any two points on the sphere can be joined by a segment of a unique great circle, which provides the shortest path between them on the sphere. The two points can also be joined by (e.g., an infinite number of) small circles intersected by 2D planes containing the two points. When using small circles, the path between the two points becomes unique when the 2D plane is fixed (e.g., fixed orthogonal to a particular axis of the sphere). For exemplary purposes, the descriptions of the viewports that follow assume that the north (N) and south (S) poles shown in FIG. 3B are fixed, together with a default coordinate system for yaw, pitch and roll (not shown). Each ROI can have an ROI center, which is a point on the sphere, specified as a viewpoint using its pitch and yaw to indicate that the ROI is the region on the sphere containing the viewpoint. For example, FIG. 3C shows an ROI 350 with a generally rectangular shape, according to some embodiments. The ROI 350 includes a viewpoint 352 as its center. The ROI 350 includes two points along the horizontal direction: the left point (LL) that is at a center of the left side of the viewpoint, and the right point (RR) that is at a center of the right side of the viewpoint. The ROI 350 includes two points along the vertical direction: the top point (TT) that is at a center of the top side of the viewpoint, and the bottom point (BB) that is at a center of the bottom side of the viewpoint.

MPEG-B Part 10 specifies a type of 2D Cartesian coordinates ('2dcc') for a rectangular region on the 2D plane, which is provided in the Appendix of N16191, "Text of ISO/IEC 23001-10:201x/FDAM 1 Carriage of spatial information, Geneva, CH (June 2016), which is hereby incorporated by reference herein in its entirety. Thus, for a 2D case, the '2dcc' can be used to identify rectangular region. For a 3D case, the representation can be complex (e.g., more complex than the 2D case), since there can be other aspects such as a direction and a region based on that direction. A viewport is a (e.g., 3D) region of an omnidirectional image or video that can be used for display and viewing. A viewpoint can represent a single camera, and multiple viewpoints can be used when there are multiple cameras (e.g., to identify where each camera is). A viewpoint group can refer to a group of viewpoints that share a same common reference coordinate system.

Figure 4B:
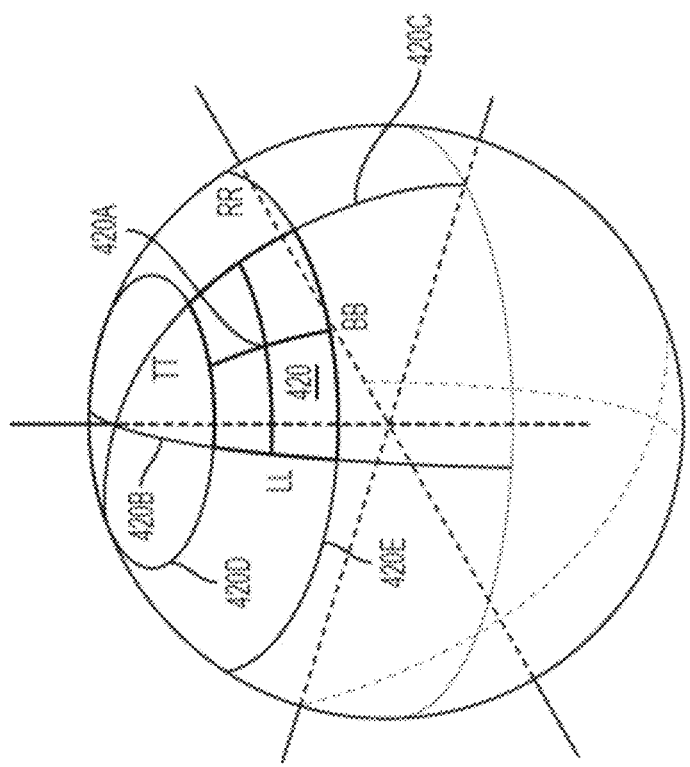
FIG. 4B shows a second rectangular ROI, according to some embodiments.
Figure 4A:
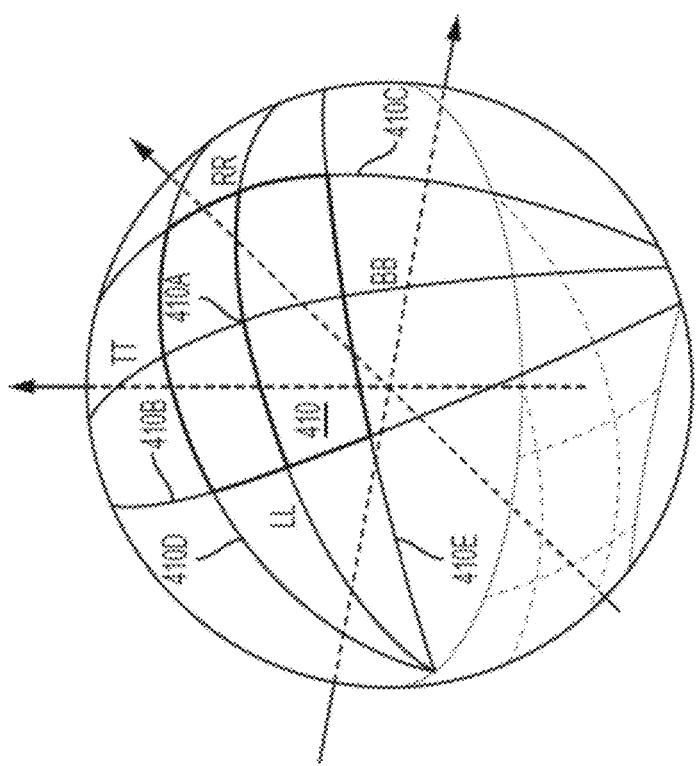
FIG. 4A shows a rectangular ROI, according to some embodiments.

FIGS. 4A-4B, which are discussed further herein, show exemplary representations of ROI shapes, according to some embodiments. In some embodiments, the ROI can take the shape of a rectangle. Other shapes can be used as well, such as circles, triangles, three-dimensional shapes, and the like. Some embodiments provide techniques to describe such various ROIs using a list of characteristics to specify the viewport with different shapes, locations, and/or other additional information regarding the ROIs, as discussed further herein.

A rectangular ROI can be expressed in various ways. For example, a rectangular area can be described on the surface of the sphere, which can be expressed using small circles, large circles, and/or a combination of small and large circles. FIG. 4A shows a rectangular ROI 410, according to some embodiments. The rectangular ROI 410 has its center viewpoint 410A at (yaw, pitch) or (centreAzimuth, centreElevation) (e.g., which can be specified with respect to an underlying default coordinate system, not shown, the center of which can be referred to as (x,y,z) and occurring at the location of the intersection of the three dotted lines shown in FIGS. 4A-4B). Rectangular ROI 410 has horizontal and vertical boundaries on great circles. A first great circle 410B intersects point LL (e.g., which can be referred to as the first center azimuth value, or cAzimuth1), a second great circle 410C intersects point RR (e.g., which can be referred to as the second center azimuth value, or cAzimuth2), a third great circle 410D intersects point TT (e.g., which can be referred to as the second elevation value, or cElevation2), and a fourth great circle 410E intersects point BB (e.g., which can be referred to as the first elevation value, or cElevation1). The rectangular ROI 410 has a width specified along the points (LL-Viewpoint-RR) or (cAzimuth1-Viewpoint-cAzimuth2), which may be taken as yaw_width. The rectangular ROI 410 has a height specified along the points (TT-Viewpoint-BB) or (cElevation2-Viewpoint-cElevation1), which may be taken as pitch_height. In some embodiments, the rectangular ROI 410 can be signaled by yaw, pitch, yaw_width, and pitch_height. The value of yaw_width can specify the width between the vertical boundaries. The value of pitch_height can specify the height between the horizontal boundaries.

FIG. 4B shows a second rectangular ROI 420, according to some embodiments. The rectangular ROI 420 has its center viewpoint 420A at (yaw, pitch) or (centreAzimuth, centreElevation). The rectangular ROI 420 has vertical boundaries on great circles. A first great circle 420B intersects point LL (e.g., or cAzimuth1), and a second great circle 420C intersects point RR (e.g., or cAzimuth2). The rectangular ROI 420 has horizontal boundaries on small circles. A first small circle 420D intersects point TT (e.g., or cElevation2), and a second small circle 420E intersects point BB (e.g., cElevation1). The rectangular ROI 420 has a height specified along the (TT-Viewpoint-BB) or (cElevation2-Viewpoint-cElevation1), which may be taken as pitch_height. The rectangular ROI 420 has a width specified along the points (LL-Viewpoint-RR) or (cAzimuth1-Viewpoint-cAzimuth2), which may be taken as yaw_width. In some embodiments, the rectangular ROI 420 can be signaled by yaw, pitch, yaw_width, and pitch_height. The value of yaw_width can specify the width between the vertical boundaries. The value of pitch_height can specify the height between the horizontal boundaries.

In some embodiments, a rectangular ROI can be represented by swapping the use of great and small circles to what is shown in FIG. 4B. For example, great circles can be used in the horizontal direction (e.g., band), and small circles can be used in the vertical direction (e.g., band). Such an exemplary ROI can have its center viewpoint at (yaw, pitch), and horizontal boundaries on great circles with the height (TT-Viewpoint-BB) between the horizontal boundaries being pitch_height, and vertical boundaries on small circles with the width (LL-Viewpoint-RR) between the vertical boundaries being yaw_width. This exemplary ROI can be signaled using (yaw, pitch, yaw_width, pitch_height).

In some embodiments, a rectangular ROI can be represented using small circles in both horizontal and vertical directions (e.g., bands). Such an exemplary rectangular ROI has its center viewpoint at (yaw, pitch), and horizontal and vertical boundaries on small circles with the width (LL-Viewpoint-RR) between the vertical boundaries being yaw_width, and the height (TT-Viewpoint-BB) between the horizontal boundaries being pitch_height. This exemplary ROI can be signaled as (yaw, pitch, yaw_width, pitch_height).

In some embodiments, the rectangular ROIs discussed herein can be specified using other techniques. For example, a rectangular ROI can be specified using (yaw, pitch, yaw_left, yaw_right, pitch_top, pitch_bottom), where the center is at (yaw, pitch) and the LL, RR, TT and BB points of the ROI are specified by yaw_left, yaw_right, pitch_top and pitch_bottom, respectively. For example, LL is at (yaw_left, pitch_bottom+(pitch_top-pitch_bottom)/2).

If multiple ROIs are supported, each ROI can be associated with an index number or a shape number. For example, if two ROIs are supported, those two ROIs can be supported with index numbers 1 and 2 to identify the type of ROI, as discussed further below. As another example, each of the ROIs shown in FIGS. 4A-4B can be represented using index numbers or shape numbers (e.g., 1 or 2 for this example, or unique numbers for each of however many ROIs are supported by the system).

In some embodiments, the Cartesian coordinates discussed herein, including 3D and 6D Cartesian coordinates, differ from their spherical counterparts. For example, the Cartesian coordinates discussed herein can differ in their regions being 2D rectangular, rather than 3D spherical (e.g., '6dcc' and '6dsc', discussed further herein). The techniques can facilitate, for example, moving among a plurality of different cameras using different viewpoints and/or viewports (e.g., including viewports specified as a rectangle, specified on a sphere, etc.). As another example, the current '2dcc' specification does not have a sample entry level definition for regions whose locations and/or sizes do not change at the sample level.

As discussed herein, for a 2D case, MPEG Part 10 includes the '2dcc' specification that can be used to identify a region of interest in a big region. FIGS. 5A and 5B show an example of the '2dcc' specification 500 and an associated 2DCartesianCoordinatesSample 550, respectively. The '2dcc' specification 500 can be used for dynamic cases, where the location and the size is specified at the sample level using the 2DCartesianCoordinatesSample 550, which can allow the metadata to change on a per-sample basis. For example, as the media presentation moves along in time, the attributes can change (e.g., the top-left-x, top-left-y, and/or other fields in the 2DCartesianCoordinatesSample 550 can change).

The '2dcc' specification does not provide for static use cases. For example, if the locations and/or sizes do not change at the sample level, the previous '2dcc' approach requires specifying (e.g., and processing) redundant data for each sample. FIG. 5A shows an exemplary syntax for a two-dimensional Cartesian coordinate sample entry 500, according to some embodiments. For illustrative purposes, an example can include a 2DCartesianCoordinatesSampleEntry '2dcc' 502 that extends MetadataSampleEntry, which will be used to explain the concepts herein, although one of skill can appreciate that other nomenclatures, structures, and/or fields can be used without departing from the spirit of the invention. The sample entry described further herein can provide an optimal approach to minimize the number of bits used and/or processing required, e.g., when the rectangular region has either static location, static size, or both.

The 2D Cartesian coordinates sample entry 500 can provide spatial information related to the referenced track, which can be expressed in a two-dimension Cartesian coordinate system. The reference_width 504 and reference_height 506 can provide the width and height of the reference rectangular space in which the rectangular region coordinates (e.g., top_left_x, top_left_y, width and height) are computed, respectively. The reference_width 504 and reference_height 506 can, for example, provide for associating a rectangular region metadata track with video tracks of different resolutions but representing the same visual source.

The dynamic_location_flag 508 can specify whether the location of the region changes. For example, a dynamic_location_flag 508 equal to 0 can specify that the location of the rectangular region remains unchanged in all samples referring to this sample entry. A dynamic_location_flag 508 equal to 1 can specify that the location of the rectangular region is indicated in the sample format.

The dynamic_size_flag 510 can specify whether the size of the region changes. For example, a dynamic_size_flag 510 equal to 0 can specify that the size of the rectangular region remains unchanged in the samples referring to this sample entry. A dynamic_size_flag 510 equal to 1 can specify that the width and height of the rectangular region are indicated in the sample format.

The static_top_left_x 512 and static_top_left_y 514 can specify the horizontal and vertical coordinate, respectively, of the top-left corner of the rectangular region for the samples referring to this sample entry. The static_width 516 and static_height 518 can specify the width and height, respectively, of the rectangular region for the samples referring to this sample entry.

FIG. 5B shows an exemplary 2D Cartesian coordinates sample 550, according to some embodiments. For illustrative purposes, an example can include a 2DCartesianCoordinatesSample class, which will be used to explain the concepts herein, although one of skill can appreciate that other nomenclatures, structures, and/or fields can be used without departing from the spirit of the invention. The top_left_x 552 and top_left_y 554 can provide the horizontal and vertical coordinate, respectively, of the top-left corner of the rectangle region associated with the media sample of the referenced track. The width 556 and height 558 can provide the width and height, respectively, of the rectangular region associated with the media sample of the referenced track. The interpolate 560 can indicate the continuity in time of the successive samples. When interpolate 560 is set to true (e.g., 1), the application may linearly interpolate values of the ROI coordinates between the previous sample and the current sample. When interpolate 560 is false (e.g., 0), there may not be any interpolation of values between the previous and the current samples. In some embodiments, the sync samples for region metadata tracks are samples with interpolate 560 set to false (e.g., 0). In some embodiments, when using interpolation, it can be expected (e.g., by a decoding device) that the interpolated samples match the presentation time of the samples in the referenced track. For example, for each video sample of a video track, the decoding device can calculate one interpolated 2D Cartesian coordinate sample. For example, the metadata may have timing that is more coarse than the video timing. So interpolation can be used to determine how to handle content in such a scenario.

As shown in the exemplary 2D Cartesian coordinates sample 550, the dynamic_location_flag 508 and the dynamic_size_flag 510 specified using the 2D Cartesian coordinates sample entry can control the size and number of fields of the 2D Cartesian coordinates sample 550. If either, or both, of the dynamic_location_flag 508 and the dynamic_size_flag 510 is set to false, then the associated fields are not specified as part of the sample. Advantageously, for static aspects, including size and/or location, the size of the sample entry can be controlled accordingly.

Figure 6:
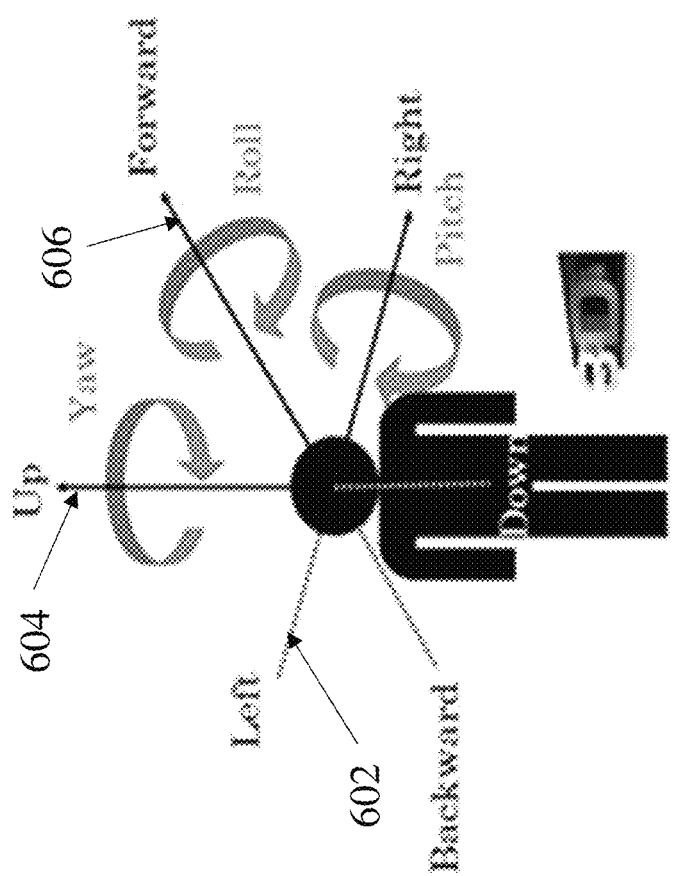
FIG. 6 shows an example of 3D and 6D coordinates, as well as profiled ranges, according to some examples.

Regarding 6D Spherical Coordinates, referring to FIG. 6, 6D coordinates can be specified with six degrees of freedom, including rotations around the X axis 602 (pitch), Y axis 604 (yaw) and Z axis 606 (roll), and full translational movements along X axis 602 (left and right), Y axis 604 (up and down) and Z axis 606 (back and forward).

FIG. 7 shows an exemplary syntax for a 6D spherical coordinates sample entry 700, according to some embodiments. For illustrative purposes, an example can include the 6DSphericalCoordinatesSampleEntry '6dsc' which extends MetadataSampleEntry, which will be used to explain the concepts herein, although one of skill can appreciate that other nomenclatures, structures, and/or fields can be used without departing from the spirit of the invention. As discussed further herein, the 6D spherical coordinates sample entry can provide spatial information of a spherical region related to the referenced track expressed in a three-dimension spherical coordinate system with additional three-degrees of freedom in full translational movements along X, Y and Z axes.

Referring to the fields shown in the 6D spherical coordinates sample entry 700, the shape_type 702 can be used to indicate how the sphere region is specified. For example, a shape_type 702 equal to 0 can specify that the sphere region is specified by four great circles. A shape_type 702 equal to 1 can specify that the sphere region is specified by two azimuth circles and two elevation circles. In some embodiments, values of the shape_type 702 can be reserved. For example, shape_type 702 values greater than 1 can be reserved. In some embodiments, the value of shape_type 702 can be used as the shape type value (e.g., as specified in an associated specification, such as the OMAF specification).

The dynamic_location_flag 704 can specify whether the center location of the sphere changes. For example, a dynamic_location_flag 704 equal to 0 can specify that the center location (center x, y and z) of the sphere region remains unchanged in the samples referring to this sample entry. A dynamic_location_flag 704 equal to 1 can specify that the center location of the sphere region is indicated in the sample format.

The dynamic_orientation_flag 706 can specify whether the orientation changes (e.g., whether the region is moving). For example, if the user views the region at the direction but does not move his head, then the flag can indicate whether or not that orientation moves (e.g., is static or dynamic). For example, a dynamic_orientation_flag 706 equal to 0 can specify that the orientation (e.g., center azimuth, elevation and/or tilt) of the sphere region remains unchanged in the samples referring to this sample entry. A dynamic_orientation_flag 706 equal to 1 can specify that the orientation of the sphere region are indicated in the sample format.

The dynamic_range_flag 708 can specify whether the range changes (e.g., whether the size changes, or not). For example, a dynamic_range_flag 708 equal to 0 can specify that the azimuth and elevation ranges of the sphere region remain unchanged in the samples referring to this sample entry. A dynamic_range_flag 708 equal to 1 can specify that the azimuth and elevation ranges of the sphere region are indicated in the sample format.

The unit_sphere_flag 710 can indicate whether the sphere is a unit sphere. For example, a unit_sphere_flag 710 equal to 0 can specify that the sphere is not a unit sphere (e.g., its radius is not equal to 1). A unit_sphere_flag 710 equal to 1 can specify that the sphere is not a unit sphere (e.g., which can be the default case). The unit sphere can be used for zooming in and out. For example, if the radius is 10, then it could zoom in at 10×, looking in magnified 10 times. If the content is zoomed in, then the user sees a smaller region on a bigger sphere; if the content is zoomed out, then the user sees a larger region of a smaller sphere.

The static_centre_x 712, static_centre_y 714, and static_centre_z 716 can specify the x, y and z axis values, respectively, of the center of the sphere region, with respect to the origin of the underlying coordinate system.

The static_centre_azimuth 718 and static_centre_elevation 720 can specify the azimuth and elevation values, respectively, of the center of the sphere region (e.g., in units of $2^{-16}$ degrees). In some embodiments, static_centre_azimuth 718 can be in the range of $-180 \times 2^{16}$ to $180 \times 2^{16}-1$, inclusive, and static_centre_elevation 720 can be in the range of $-90 \times 2^{16}$ to $90 \times 2^{16}$, inclusive.

The static_centre_tilt 722 can specify the tilt angle of the sphere region (e.g., in units of $2^{-16}$ degrees). In some embodiments, the static_centre_tilt can be in the range of $-180 \times 2^{16}$ to $180 \times 2^{16}-1$, inclusive.

The static_azimuth_range 724 and static_elevation_range 726 can specify the azimuth and elevation ranges, respectively, of the sphere region for each sample referring to this sample entry (e.g., in units of $2^{-16}$ degrees). The static_azimuth_range 724 and static_elevation_range 726 can specify the ranges through the centre point of the sphere region. In some embodiments, the static_azimuth_range 724 can be in the range of 0 to $360 \times 2^{16}$, inclusive. In some embodiments, the static_elevation_range 726 can be in the range of 0 to $180 \times 2^{16}$, inclusive. In some embodiments, when the static_azimuth_range 724 and static_elevation_range 726 are present and are both equal to 0, the sphere region for each sample referring to this sample entry can be a point on a spherical surface. When static_azimuth_range 724 and static_elevation_range 726 are present, the values of azimuth_range and elevation_range can be inferred to be equal to static_azimuth_range 724 and static_elevation_range 726, respectively.

The sphere_radius 728 can specify the radius of the sphere (e.g., when it is not a unit sphere).

As shown in the 6D spherical coordinate sample entry 700, the dynamic_location_flag 704, the dynamic_orientation_flag 706, and the dynamic_range_flag 708 can control the size and number of fields of the 6D spherical coordinate sample entry 700. If one or more of the dynamic_location_flag 704, the dynamic_orientation_flag 706, and the dynamic_range_flag 708 is set to 0 in this example, then the associated fields are specified as part of the sample (otherwise, the fields are not included). Advantageously, for static aspects, including location, orientation and/or range, the size of the sample entry can be controlled accordingly.

FIG. 8 shows an exemplary syntax for a 6D spherical coordinates sample 800, according to some embodiments. For illustrative purposes, an example can include the 6DSphericalCoordinatesSample class, which will be used to explain the concepts herein, although one of skill can appreciate that other nomenclatures, structures, and/or fields can be used without departing from the spirit of the invention.

Referring to the fields shown in the 6D spherical coordinates sample 800, the centre_x 802, centre_y 804 and centre_z 806 specify the x, y and z axis values, respectively, of the centre of the sphere region.

The centre_azimuth 808 and centre_elevation 810 can specify the azimuth and elevation values, respectively, of the center of the sphere region (e.g., in units of $2^{-16}$ degrees). In some embodiments, the centre_azimuth 808 can be in the range of $-180 \times 2^{16}$ to $180 \times 2^{16}-1$, inclusive. The centre_elevation 810 can be in the range of $-90 \times 2^{16}$ to $90*2^{16}$, inclusive.

The centre_tilt 812 can specify the tilt angle of the sphere region (e.g., in units of $2^{-16}$ degrees). In some embodiments, the centre_tilt 906 can be in the range of –b $180 \times 2^{16}$ to $180 \times 2^{16}-1$, inclusive.

The azimuth_range 814 and elevation_range 816, when present, can specify the azimuth and elevation ranges, respectively, of the sphere region (e.g., specified in units of $2^{-16}$ degrees). The azimuth range 814 and elevation range 816 can specify the range through the centre point of the sphere region. In some embodiments, when azimuth_range 814 and elevation_range 816 are not present, they can be inferred to be equal to static_azimuth_range and static_elevation_range, respectively, in the sample entry. In some embodiments, the azimuth_range 814 can be in the range of 0 to $360 \times 2^{16}$, inclusive. The elevation_range 816 can be in the range of 0 to $180 \times 2^{16}$, inclusive.

The interpolate 818 can indicate the continuity in time of the successive samples. For example, interpolate 818 equal to 0 can specify that the values of centre_azimuth 808, centre_elevation 810, centre_tilt 812, azimuth_range 814 (if present), and elevation_range 816 (if present) in this sample apply to the target media samples. Interpolate 818 equal to 1 can specify that the values of centre_azimuth 808, centre_elevation 810, centre_tilt 812, azimuth_range 814 (if present), and elevation_range 816 that apply to the target media samples are linearly interpolated from the values of the corresponding fields in this sample and the previous sample. In some embodiments, the value of interpolate 818 for a sync sample, the first sample of the track, and the first sample of a track fragment shall be equal to 0.

As shown in the exemplary 6D spherical coordinates sample 800, the dynamic_location_flag, dynamic_orientation_flag, and dynamic_range_flag specified using the 6D spherical coordinates sample entry can control the size and number of fields of the 6D spherical coordinates sample 800. If one or more of the dynamic_location_flag, dynamic_orientation_flag, and dynamic_range_flag is set to false, then the associated fields are not included as part of the sample. Advantageously, for static aspects, including location, orientation and/or range, the size of the sample entry can be controlled accordingly.

Viewports/ROIs can be specified using Cartesian coordinates. 3D Cartesian coordinates can be specified for the content with 6DoF, and with the field of view to be a 2D rectangular region (e.g., rather than a 3D spherical region). The plane of the region can describe a 2D region or rectangular region in the 3D context. The 3D Cartesian coordinates can be used, for example, to overlay content on the rectangle range over spherical background. For example, it can be desirable to show a commercial or text to indicate there is a car within a viewport being observed by a user. Since the region is within the 3D environment, it can be desirable to specify where the region is in terms of its orientation (e.g., direction from the center of the sphere to the surface of the region) and the size (e.g., the size of width/height of rectangle). A rectangular region may not be a viewport, rather it may simply just identify a rectangle region.

Figure 9:
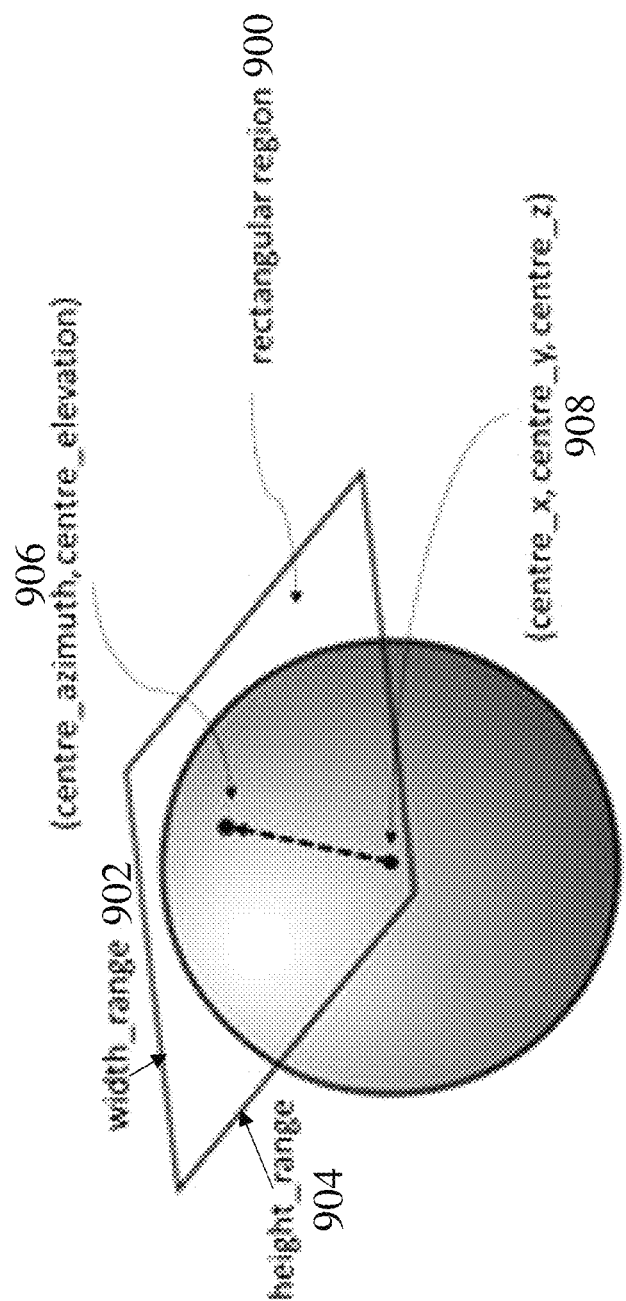
FIG. 9 shows an example of 3D Cartesian coordinates for a 2D rectangular region, according to some examples.

FIG. 9 shows an example of 6D Cartesian coordinates for a 2D rectangular region 900, according to some examples. The rectangular region 900 has a width shown by width_range 902 and a height shown by height_range 904. The rectangular region 900 has a center 906 located at the specified azimuth and elevation, indicated by center_azimuth and center_elevation, respectively. The center of the sphere region 908 can be specified (e.g., via centre_x, centre_y, and centre_z).

FIG. 10 is an exemplary syntax for a 6D Cartesian coordinates sample entry 1000, according to some embodiments. For illustrative purposes, an example can include the 6DCartesianCoordinatesSampleEntry '6dcc' that extends MetadataSampleEntry, which will be used to explain the concepts herein, although one of skill can appreciate that other nomenclatures, structures, and/or fields can be used without departing from the spirit of the invention. The 6D Cartesian coordinates sample entry can provide spatial information of a rectangular region (e.g., including its weight and height), related to the referenced track expressed in a three-dimension spherical coordinate system. The 6D Cartesian coordinates sample entry can additionally include three-degrees of freedom in full translational movements along the X, Y and Z axes.

The 6D Cartesian coordinates sample entry 1000 can include fields that are similar to the fields discussed in conjunction with the 6D spherical coordinate sample entry 700 (e.g., shape_type 702, dynamic_location_flag 704, dynamic_orientation_flag 706, dynamic_range_flag 708, the unit_sphere_flag 710, static_centre_x 712, static_centre_y 714, and static_centre_z 716, static_centre_azimuth 718, static_centre_elevation 720, static_centre_tilt 722, and sphere_radius 728). The shape_type 1002 can be used to indicate how the sphere region is specified (e.g., four great circles, two azimuth circles and two elevation circles, and/or the like). The dynamic_location_flag 1004 can specify whether the center location of the sphere changes. The dynamic_orientation_flag 1006 can specify whether the orientation changes in the samples referring to this sample entry. The dynamic_range_flag 1008 can specify whether the range changes in the samples referring to this sample entry. The unit_sphere_flag 1010 can indicate whether the sphere is a unit sphere. The static_centre_x 1012, static_centre_y 1014, and static_centre_z 1016 can specify the x, y and z axis values, respectively, of the center of the sphere region, with respect to the origin of the underlying coordinate system. The static_centre_azimuth 1018 and static_centre_elevation 1020 can specify the azimuth and elevation values, respectively, of the center of the rectangular region. The static_centre_tilt 1022 can specify the tilt angle of the rectangular region. The sphere_radius 1028 can specify the radius of the sphere.

The static_width_range 1024 and static_height_range 1026, when present, can specify the width and height ranges, respectively, of the rectangular region for each sample referring to this sample entry. The static_width_range 1024 and static_height_range 1026 can specify the ranges through the center point of the rectangular region, as illustrated in FIG. 9. When the static_width_range 1024 and static_height_range 1026 are not present (e.g., dynamic_range_flag=1), the width and height ranges of the rectangular region can assume the values of the width_range and height_range specified in the samples that refer to this sample entry.

As shown in the 6D Cartesian coordinate sample entry 1000, the dynamic_location_flag, dynamic_orientation_flag, and the dynamic_range_flag can control the size and number of fields of the 6D Cartesian coordinate sample entry 1000. If one or more of the dynamic_location_flag, dynamic_orientation_flag, and the dynamic_range_flag is set to 0 in this example, then the associated fields are specified as part of the sample (otherwise, the fields are not included). Advantageously, for static aspects, including location, orientation and/or range, the size of the sample entry can be controlled accordingly.

FIG. 11 shows an exemplary syntax for a 6D Cartesian coordinate sample 1100, according to some embodiments. For illustrative purposes, an example can include the 6DCartesianCoordinatesSample class, which will be used to explain the concepts herein, although one of skill can appreciate that other nomenclatures, structures, and/or fields can be used without departing from the spirit of the invention.

The 6D Cartesian coordinates sample 1100 can include fields that are similar to the fields discussed in conjunction with the 6D spherical coordinate sample 800 (e.g., centre_x 802, centre_y 804 and centre_z 806, centre_azimuth 808, centre_elevation 810, centre_tilt 812, and interpolate 818). The centre_x 1102, centre_y 1104 and centre_z 1106 can specify the x, y and z axis values, respectively, of the center of the sphere region. The centre_azimuth 1108 and centre_elevation 1110 can specify the azimuth and elevation values, respectively, of the center of the sphere region. The centre_tilt 1112 can specify the tilt angle of the sphere region. The interpolate 1118 can indicate the continuity in time of the successive samples.

The width_range 1114 and height_range 1116, when present, can specify the width and height ranges, respectively, of the rectangular region. The width_range 1114 and height_range 1116 can specify the ranges through the center point of the rectangular region, as shown in FIG. 9. When width_range 1114 and height_range 1116 are not present (e.g., dynamic_range_flag==0), the width and height ranges of the rectangular region can assume the values of the static_width_range and static_height_range specified in the sample entry.

Point cloud data can include a set of 3D points in a scene. Each point can be specified based on an (x, y, z) position and color information, such as (R,V,B), (Y,U,V), reflectance, transparency, and/or the like. The point cloud points are typically not ordered, and typically do not include relations with other points (e.g., such that each point is specified without reference to other points). Point cloud data can be useful for many applications, such as 3D immersive media experiences that provide 6DoF. However, point cloud information can consume a significant amount of data, which in turn can consume a significant amount of bandwidth if being transferred between devices over network connections. For example, 800,000 points in a scene can consume 1 Gbps, if uncompressed. Therefore, compression is typically needed in order to make point cloud data useful for network-based applications.

Figure 12:
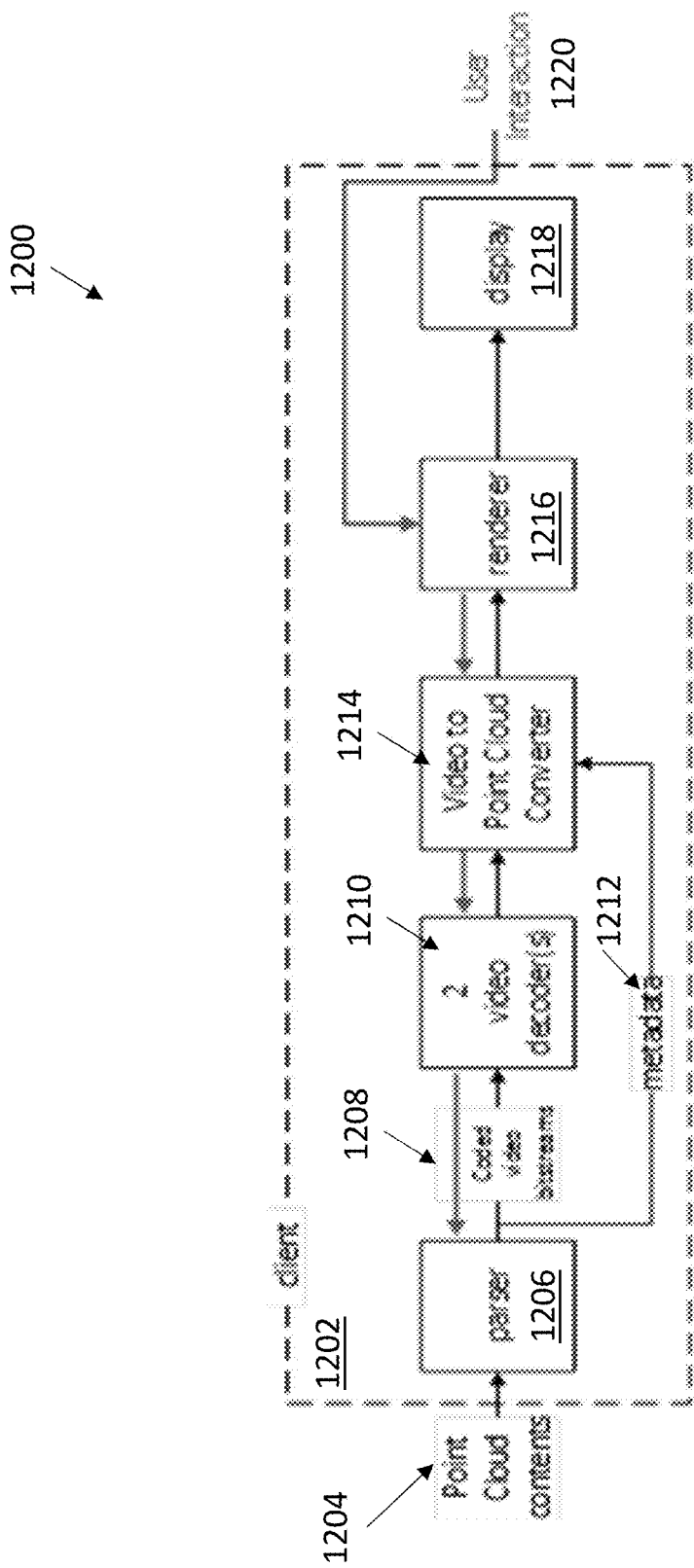
FIG. 12 shows an exemplary processing flow for point cloud content, according to some examples.

MPEG has been working on point cloud compression to reduce the size of point cloud data, which can enable streaming of point cloud data in real-time for consumption on other devices. FIG. 12 shows an exemplary processing flow 1200 for point cloud content as a specific instantiation of the general 3DoF+/6DoF processing model, according to some examples. The processing flow 1200 is described in further detail in N17771, "PCC WD V-PCC (Video-based PCC)," July 2018, Ljubljana, SI, which is hereby incorporated by reference herein in its entirety. The client 1202 receives the point cloud media content file 1204, which is composed of two 2D planar video bitstreams and metadata that specifies a 2D planar video to 3D volumetric video conversion. The content 2D planar video to 3D volumetric video conversion metadata can be located either at the file level as timed metadata track(s) or inside the 2D video bitstream as SEI messages.

The parser module 1206 reads the point cloud contents 1204. The parser module 1206 delivers the two 2D video bitstreams 1208 to the 2D video decoder 1210. The parser module 1206 delivers the 2D planar video to 3D volumetric video conversion metadata 1212 to the 2D video to 3D point cloud converter module 1214. The parser module 1206 at the local client can deliver some data that requires remote rendering (e.g., with more computing power, specialized rendering engine, and/or the like) to a remote rendering module (not shown) for partial rendering. The 2D video decoder module 1210 decodes the 2D planar video bistreams 1208 to generate 2D pixel data. The 2D video to 3D point cloud converter module 1214 converts the 2D pixel data from the 2D video decoder(s) 1210 to 3D point cloud data if necessary using the metadata 1212 received from the parser module 1206.

The renderer module 1216 receives information about users' 6 degree viewport information and determines the portion of the point cloud media to be rendered. If a remote renderer is used, the users' 6DoF viewport information can also be delivered to the remote render module. The renderer module 1216 generates point cloud media by using 3D data, or a combination of 3D data and 2D pixel data. If there are partially rendered point cloud media data from a remote renderer module, then the renderer 1216 can also combine such data with locally rendered point cloud media to generate the final point cloud video for display on the display 1218. User interaction information 1220, such as a user's location in 3D space or the direction and viewpoint of the user, can be delivered to the modules involved in processing the point cloud media (e.g., the parser 1206, the 2D video decoder(s) 1210, and/or the video to point cloud converter 1214) to dynamically change the portion of the data for adaptive rendering of content according to the user's interaction information 1220.

Figure 13:
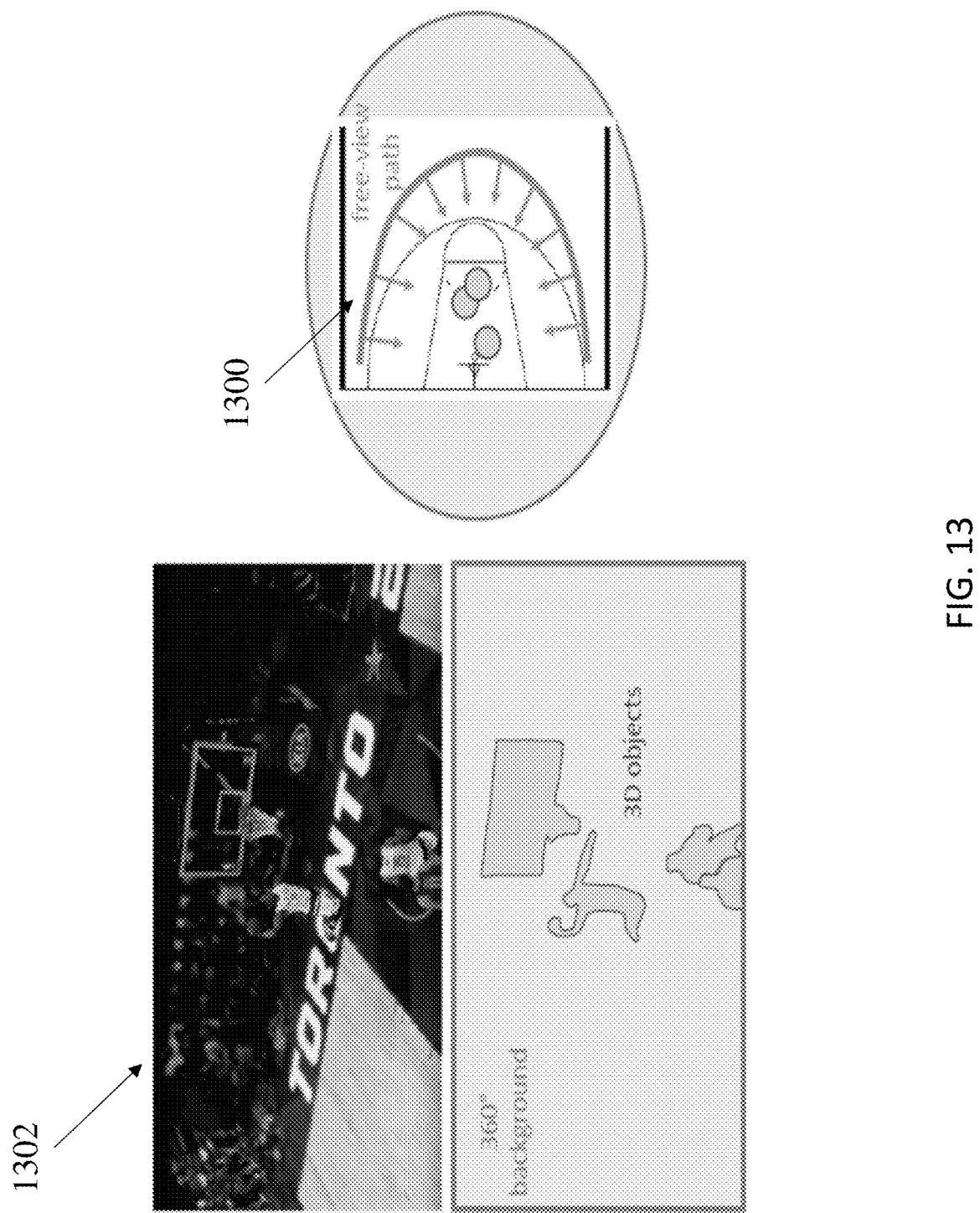
FIG. 13 shows an example of a free-view path, according to some examples.

The inventors have appreciated that user interaction information for point cloud media needs to be provided for in order to achieve such user interaction-based rendering. In particular, the user interaction information 1220 needs to be specified and signaled in order for the client 1202 to communicate with the render module 1216, including to provide information of user-selected viewports. The inventors have also appreciated that it is desirable for point cloud content to be presented to the user via editor cuts, or as recommended or guided views or viewports. FIG. 13 shows an example of a free-view path 1300, according to some examples. The free-view path 1300 allows the user to move about the path to view the scene 1302 from different viewpoints. The inventors have therefore appreciated that it is desirable to specify such user interaction information, including to provide recommended or guided views, for point cloud data. There is currently no way to provide for viewports of point cloud data.

The techniques described herein provide for signaling viewports, such as recommended viewports, for point cloud content. For example, the techniques can be used to provide Video-based Point Cloud Compression (V-PCC) viewports, such as recommended viewports. A point cloud viewport, such as a PCC (e.g., V-PCC or G-PCC (Geometry based Point Cloud Compression)) viewport, can be a region of point cloud content suitable for display and viewing by a user. Depending on a user's viewing device(s), the viewport can be a 2D viewport or a 3D viewport. For example, a viewport can be a 3D spherical region or a 2D planar region in the 3D space, with six degrees of freedom (6 DoF). The techniques can leverage 6D spherical coordinates (e.g., '6dsc' as discussed in conjunction with FIG. 7) and/or 6D Cartesian coordinates (e.g., '6dcc' as discussed in conjunction with FIG. 10) to provide point cloud viewports. The techniques can include the 6D spherical coordinates and/or 6D Cartesian coordinates as timed metadata, such as timed metadata in ISOBMFF. The techniques can use the 6D spherical coordinates and/or 6D Cartesian coordinates to specify 2D point cloud viewports and 3D point cloud viewports, including for V-PCC content stored in ISOBMFF files. As described herein, the '6dsc' and '6dcc' are natural extensions to the 2D Cartesian coordinates '2dcc' for planar regions in the 2D space, as provided for in MPEG-B part 10.

In V-PCC, the geometry and texture information of a video-based point cloud is converted into 2D projected frames and then compressed as a set of different video sequences. The video sequences can be of three types: one representing the occupancy map information, a second representing the geometry information and a third representing the texture information of the point cloud data. A geometry track may contain, for example, one or more geometric aspects of the point cloud data, such as shape information, size information, and/or position information of a point cloud. A texture track may contain, for example, one or more texture aspects of the point cloud data, such as color information (e.g., RGB (Red, Green, Blue) information), opacity information, reflectance information and/or albedo information of a point cloud. These tracks can be used for reconstructing the set of 3D points of the point cloud. Additional metadata needed to interpret the geometry and video sequences, such as auxiliary patch information, can also be generated and compressed separately. While examples provided herein are explained in the context of V-PCC, it should be appreciated that such examples are intended for illustrative purposes, and that the techniques described herein are not limited to V-PCC.

V-PCC has yet to finalize a track structure. An exemplary track structure under consideration in the working draft of V-PCC in ISOBMFF is described in N18059, "WD of Storage of V-PCC in ISOBMFF Files," October 2018, Macau, CN, which is hereby incorporated by reference herein in its entirety. The track structure can include a track that includes a set of patch streams, where each patch stream is essentially a different view for looking at the 3D content. As an illustrative example, if the 3D point cloud content is thought of as being contained within a 3D cube, then there can be six different patches, with each patch being a view of one side of the 3D cube from the outside of the cube. The track structure also includes a timed metadata track and a set of restricted video scheme tracks for geometry, attribute (e.g., texture), and occupancy map data. The timed metadata track contains V-PCC specified metadata (e.g., parameter sets, auxiliary information, and/or the like). The set of restricted video scheme tracks can include one or more restricted video scheme tracks that contain video-coded elementary streams for geometry data, one or more restricted video scheme tracks that contain video coded elementary streams for texture data, and a restricted video scheme track containing a video-coded elementary stream for occupancy map data. The V-PCC track structure can allow changing and/or selecting different geometry and texture data, together with the timed metadata and the occupancy map data, for variations of viewport content. It can be desirable to include multiple geometry and/or texture tracks for a variety of scenarios. For example, the point cloud may be encoded in both a full quality and one or more reduced qualities, such as for the purpose of adaptive streaming. In such examples, the encoding may result in multiple geometry/texture tracks to capture different samplings of the collection of 3D points of the point cloud. Geometry/texture tracks corresponding to finer samplings can have better qualities than those corresponding to coarser samplings. During a session of streaming the point cloud content, the client can choose to retrieve content among the multiple geometry/texture tracks, in either a static or dynamic manner (e.g., according to client's display device and/or network bandwidth).

However, while point cloud track structures can allow for different tracks for point cloud aspects such as for geometry and/or attributes/textures, the inventors have appreciated that a viewport cannot be specified for such point cloud tracks because encoders and/or decoders cannot associate a viewport with one of a plurality of such tracks. It can be desirable to associate a viewport with specific tracks, such as specific geometry and/or texture tracks, for various reasons. For example, since there may be multiple geometry/texture tracks, there may be geometry/texture tracks that are not relevant to viewport(s) of the track. Using ISOBMFF, for example, there may be geometry/texture tracks in an ISOBMFF file that are not relevant to each included viewport(s). Therefore, a decoder cannot determine the association within a file of a viewport and geometry/texture tracks without being able to determine (e.g., via explicit signaling) the association of each viewport with the proper geometry/texture tracks. As another example, to provide efficient viewport dependent media processing, a point cloud may be first partitioned into a number of regions before its regional content is encoded and packaged into multiple geometry/texture tracks. Thus, it can be desirable to associate each viewport with its relevant regional tracks (e.g., and therefore particular geometry/texture tracks for the region).

The techniques described herein provide for associating viewports with point cloud track structures, such as V-PCC track structures like that discussed in N18059. If a point cloud track structure includes multiple component tracks for occupancy, geometry and/or attributes, the techniques can be used associate a viewport with specific tracks where there are a plurality of such tracks. For example, a viewport can be associated with specific track identifiers (IDs), such as specific geometry track IDs and/or specific texture track IDs. As a result, the techniques can provide for associating the viewport with specific geometry/texture tracks in order to provide specific experience to reflect, for instance, editor's cuts and/or different recommendations. For example, a point cloud may be encoded with different texture tracks in different temperature colors, and a recommendation viewport may be warmer than another, and therefore two viewports may be associated with their corresponding texture tracks with right temperature colors.

Figure 14A:
FIG. 14A shows an exemplary 3D video-based point cloud compression (V-PCC) viewport sample entry, according to some embodiments.

In some embodiments, the techniques provided herein can provide for timed metadata tracks that extend the 6D spherical coordinates and 6D Cartesian coordinates described herein to point cloud track structures. In some embodiments, 3D point cloud viewport can be specified for a timed metadata track for a sequence of spherical regions of content viewed in 6DoF, such as shown in FIG. 6. The 3D point cloud viewport can be, for example, a recommended, dynamic V-PCC viewport. FIG. 14A shows an exemplary 3D V-PCC viewport sample entry '3pcv' 1400, according to some embodiments. The 3D V-PCC viewport sample entry 1400 can have as a container a Sample Description Box ('stsd'), is not mandatory, and therefore can include a quantity of 0 or 1. For illustrative purposes, an example can include the 3DV-PCCViewportSampleEntry class, which will be used to explain the concepts herein, although one of skill can appreciate that other nomenclatures, structures, and/or fields can be used without departing from the spirit of the invention.

The 3D V-PCC viewport sample entry 1400 extends the 6D spherical coordinates sample entry, with potential selections of geometry and texture tracks in case they have choices. The multiple_geometry_flag 1402 can specify whether there are multiple geometry tracks. For example, if multiple_geometry_flag 1402 is equal to 0, multiple_geometry_flag 1402 can specify that there is only one geometry track. If multiple_geometry_flag 1402 is equal to 1, then multiple_geometry_flag 1402 can specify that there is more than one geometry track.

The multiple_texture_flag 1404 can specify whether there are multiple texture tracks. For example, multiple_texture_flag 1404 equal to 0 can specify that there is only one texture track. If multiple_texture_flag 1404 is equal to 1, then multiple_texture_flag 1404 can specify that there is more than one texture track.

The geometry_track_ID 1406 can specify the identifier of a geometry track to be used for the viewport. The texture_track_ID 1408 can specify the identifier of a texture track to be used for the viewport.

Figure 14B:
FIG. 14B shows another exemplary 3D V-PCC viewport sample entry, according to some embodiments.

Various structures and/or fields can be used to achieve the techniques described herein, including those shown in FIG. 14A. FIG. 14B shows another exemplary 3D V-PCC viewport sample entry '3pcv' 1450, according to some embodiments. Comparing the 3D V-PCC viewport sample entry '3pcv' 1450 to the 3D V-PCC viewport sample entry '3pcv' 1400, the 3D V-PCC viewport sample entry '3pcv' 1450 omits the multiple_geometry_flag 1402 and the multiple_texture_flag 1404, and includes the geometry_track_ID 1406 and the texture_track_ID 1408.

In some embodiments, a 2D point cloud viewport can be specified for a timed metadata track for a sequence of spherical regions of content viewed in 6DoF, such as shown in FIG. 9. The 2D point cloud viewport can be, for example, a recommended, dynamic V-PCC viewport. FIG. 15A shows an exemplary 2D V-PCC viewport sample entry '2pcv' 1500, according to some embodiments. The 2D V-PCC viewport sample entry 1500 can have as a container a Sample Description Box ('stsd'), is not mandatory, and therefore can include a quantity of 0 or 1. For illustrative purposes, an example can include the 2DV-PCCViewportSampleEntry class, which will be used to explain the concepts herein, although one of skill can appreciate that other nomenclatures, structures, and/or fields can be used without departing from the spirit of the invention.

The 2D V-PCC viewport sample entry '2pcv' 1500 includes similar fields as the 3D V-PCC viewport sample entry 1400, including the multiple_geometry_flag 1402, multiple_texture_flag 1404, geometry_track_ID 1406, and texture_track_ID 1408. The multiple_geometry_flag 1502 can specify whether there are multiple geometry tracks. The multiple_texture_flag 1504 can specify whether there are multiple texture tracks. The geometry_track_ID 1506 can specify the identifier of a geometry track to be used for the viewport. The texture_track_ID 1508 can specify the identifier of a texture track to be used for the viewport.

Various structures and/or fields can be used to achieve the techniques described herein, including those shown in FIG. 15A. FIG. 15B shows another exemplary 2D V-PCC viewport sample entry '2pcv' 1550, according to some embodiments. Comparing the 2D V-PCC viewport sample entry '2pcv' 1550 to the 2D V-PCC viewport sample entry '2pcv' 1500, the 2D V-PCC viewport sample entry '2pcv' 1550 omits the multiple_geometry_flag 1502 and the multiple_texture_flag 1504, and includes the geometry_track_ID 1506 and the texture_track_ID 1508.

Figure 16:
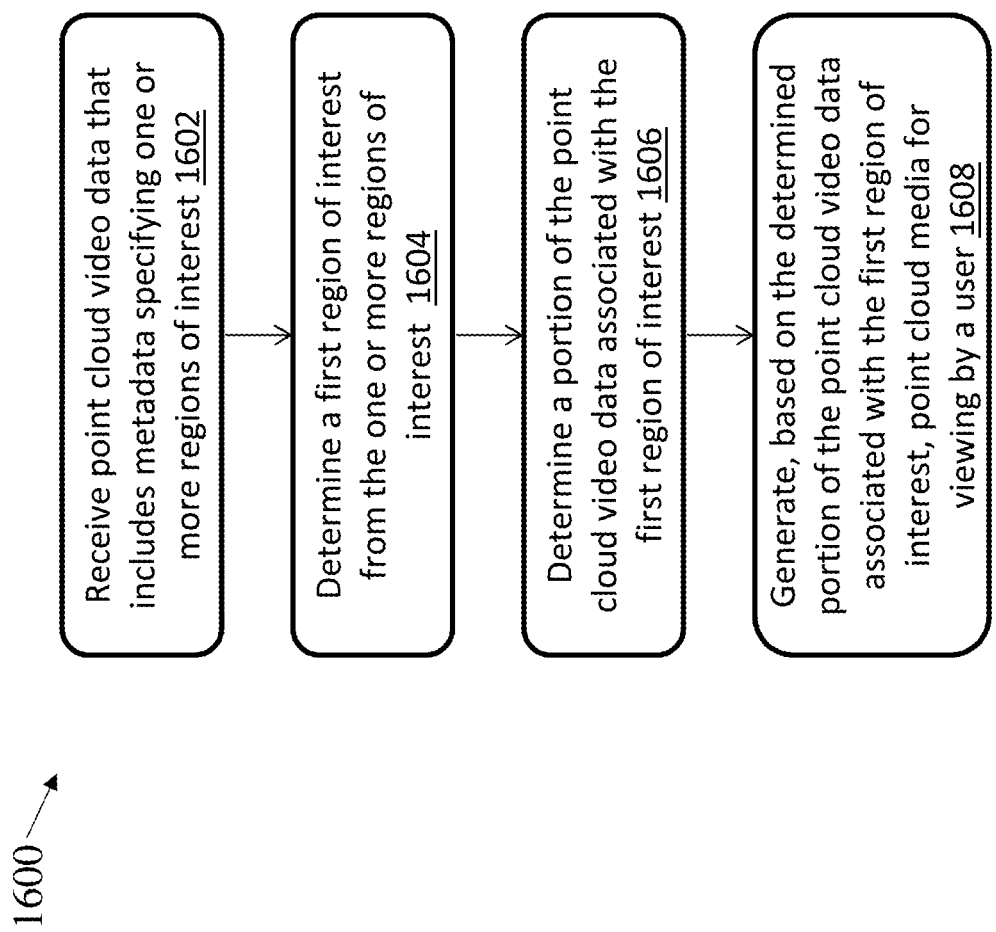
FIG. 16 shows an exemplary method of decoding video data with a region of interest, according to some embodiments.

FIG. 16 shows an exemplary method 1600 of decoding video data with a region of interest, according to some embodiments. The method 1600 can generally be used to decode point cloud data using a region of interest/viewport. At step 1602, the device (e.g., the client device 1202 in FIG. 12) receives point cloud video data (e.g., point cloud contents 1204) that includes metadata (e.g., metadata 1212) specifying one or more regions of interest of the point cloud video data. At step 1604, the device determines a first region of interest from the one or more regions of interest (e.g., an initial viewport, such as a recommended viewport). At step 1606, the device determines a portion of the point cloud video data associated with the first region of interest. At step 1608, the device generates, based on the determined portion of the point cloud video data associated with the first region of interest, point cloud media for viewing by a user.

Referring to step 1602, as described herein, the point cloud video data can include two two-dimensional (2D) planar video bit streams and metadata specifying a conversion of the set of 2D planar video bit streams to 3D volumetric media. As also described herein, the point cloud video data can be V-PCC data. The point cloud video data can include a track structure that includes a timed metadata track and a set of restricted video scheme tracks for geometry (e.g., one or more geometry tracks), texture (e.g., one or more texture tracks), and occupancy map data, such that the V-PCC track structure can allow changing or selecting different geometry and texture data, together with the timed metadata and the occupancy map data, for variations of viewport content. In some embodiments, the point cloud video data may include a track structure that includes one more timed metadata tracks that specify one or more regions of interest of the point cloud data, where each timed metadata track specifies one region of interest. In some embodiments, multiple regions of interest can be specified within a single timed metadata track. FIGS. 18-19 show exemplary syntaxes 1800 and 1900, respectively, which expand the timed metadata track of type '6dsc' of FIGS. 7-8 to specify one or more regions of interest, according to some embodiments. As shown in FIG. 18, the syntax 1800 includes a number_of_regions field 1802 that can be used to specify the number of regions in the point cloud media. As shown at portion 1804 of the syntax 1800, the number_of_regions field 1802 is used to specify the syntax elements discussed in conjunction with FIG. 7 for each region. As shown in FIG. 19, the syntax 1900 includes portion 1902 that is used to specify the syntax elements discussed in conjunction with FIG. 8 for each region.

In some examples, the device determines the geometry and/or texture tracks based on the region of interest. The region of interest can include data that specifies a first identifier for a geometry track of the point cloud video data (e.g., geometry_track_ID 1406 in FIGS. 14A-B or geometry_track_ID 1506 in FIGS. 15A-B) and/or a second identifier for a texture track of the point cloud video data (e.g., texture_track_ID 1408 in FIGS. 14A-B or texture_track_ID 1508 in FIGS. 15A-B). The device can determine which geometry and/or texture tracks to use based on such information specified in the region of interest.

Figure 17:
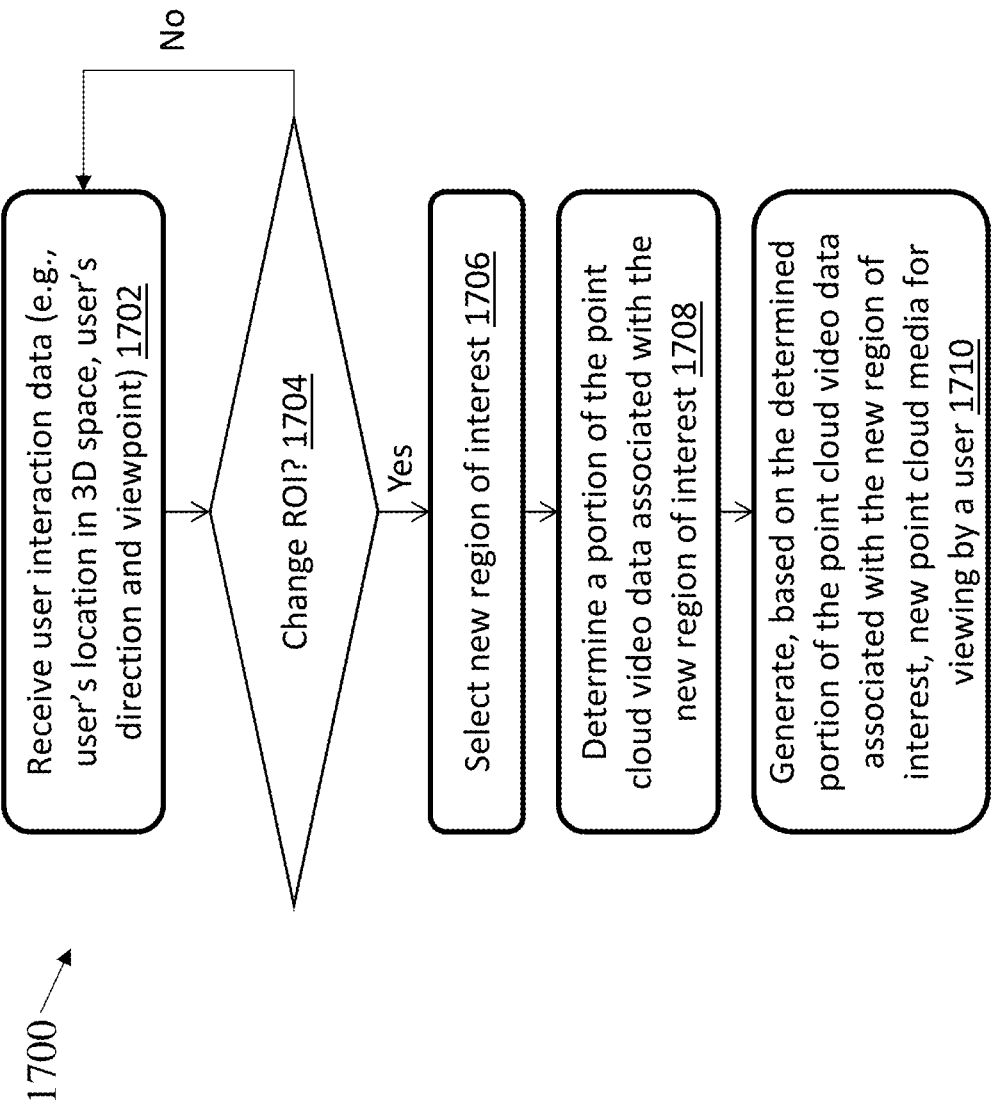
FIG. 17 shows an exemplary computerized method for changing the viewport of point cloud data based on user interaction data, according to some embodiments.

Referring to step 1604, in some embodiments, the device determines the subset of data of the 2D planar video bit streams associated with the region of interest. The system can dynamically change the portion of the 2D planar video bit stream data to adaptively render content for changed viewports. FIG. 17 shows an exemplary computerized method 1700 for changing the viewport of point cloud data based on user interaction data, according to some embodiments. At step 1704, the device receives user interaction data associated with the point cloud video data, including the user's location in 3D space, the user's direction and viewpoint, and/or the like. The system can use the interaction data to dynamically change the processing of the point cloud video data. At step 1704, the device determines whether to change the region of interest based on the received user interaction data. If the device determines that it is to change the region of interest based on the received user interaction data, the method proceeds to step 1706 and selects a new region of interest. Otherwise the method proceeds back to step 1702 and waits for further user interaction data. At step 1708, the device determines a new portion of the point cloud video data associated with the newly selected region of interest. At step 1710, the device generates, based on the new portion of the point cloud video data, new point cloud media for viewing by the user.

The region of interest can include a region structure, such as a 6D spherical coordinates sample entry or a 6D Cartesian coordinates sample entry, that specifies one or more aspects of the region of interest based on a sphere. As described in conjunction with FIGS. 7-8 and 10-11, the one or more aspects can include a location of the first region of interest, an orientation of the first region of interest, a range of the first region of interest, or some combination thereof. The region structure can include, for example, one or more flags indicative of whether the region structure includes global (e.g., static) information that applies to samples associated with the region structure. The flags can include, for example, a dynamic orientation flag, a dynamic location flag, a dynamic range flag, and/or other flags indicative of whether the region structure specifies information that applies to the samples associated with the region of interest.

Referring to some embodiments for step 1606, the device determines whether the region structure includes a global (e.g., static) coordinate aspect (e.g., location, orientation, range, etc.) for the region of interest. In some embodiments, the decoding device may determine that the region structure includes one or more global aspects. In some embodiments, the decoding device may determine that the region structure includes one or more global aspects, but does not include one or more other aspects. For example, the region structure may specify a global aspect (e.g., location, orientation or range), while the region structure may not specify other possible aspects (e.g., such that the non-specified location, orientation, range, etc. are specified for each sample that is associated with the region of interest).

Referring to some embodiments for step 1608, the decoding device determines the region of interest in the point cloud video data based on whether the region structure comprises data indicative of the one or more global aspects of the region of interest. The decoding device determines which aspects are specified by the region structure (e.g., which apply to the samples referencing the region structure), as well as the other aspects specified on a per-sample basis.

For an illustrative example for 6D spherical coordinates, the decoding device may determine that the '6dsc' region structure specifies both a static orientation (e.g., static center azimuth, elevation and tilt) and range (e.g., static azimuth and elevation range), and therefore the 6D spherical coordinate sample for each sample does not specify either the orientation or range, but does specify the location. As another example, the decoding device may determine that the '6dsc' region structure specifies only a static orientation, and therefore the 6D spherical coordinate sample for each sample specifies the (e.g., non-static) range and location.

As discussed herein, the techniques can be similarly used to encode video content. The techniques can include encoding point cloud video data that includes metadata specifying one or more regions of interest of the point cloud video data. Encoding the point cloud video data can include determining a first region of interest of the one or more regions of interest, determining a portion of the point cloud video data associated with the first region of interest, and encoding, based on the determined portion of the point cloud video data associated with the first region of interest, the point cloud video data comprising encoding the metadata specifying the one or more regions of interest of the point cloud video data.

Various exemplary syntaxes and use cases are described herein, which are intended for illustrative purposes and not intended to be limiting. It should be appreciated that only a subset of these exemplary fields may be used for a particular region and/or other fields may be used, and the fields need not include the field names used for purposes of description herein. For example, the syntax may omit some fields and/or may not populate some fields (e.g., or populate such fields with a null value) depending on the type of ROI or viewport. As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
  receiving point cloud video data comprising:
    a plurality of media samples of the point cloud video data; and
    a sample entry structure comprising metadata specifying one or more regions of interest of the point cloud video data, wherein the sample entry structure includes one or more of:
      dynamic location information indicative of whether a location of the one or more regions change in at least one of the plurality of media samples of the point cloud video data that refer to the sample entry structure; and
      dynamic size information indicative of whether a size of the one or more regions changes in at least one of the plurality of media samples that refer to the sample entry structure;
  determining a first region of interest from the one or more regions of interest;
  determining a portion of the point cloud video data associated with the first region of interest, comprising determining at least one of the plurality of media samples of the point cloud video data references the sample entry structure; and
  generating, based on the determined portion of the point cloud video data associated with the first region of interest, point cloud media for viewing by a user.

2. The method of claim 1, wherein:
  receiving the point cloud video data comprises receiving a set of two-dimensional (2D) planar video bit streams and second metadata specifying a conversion of the set of 2D planar video bit streams to 3D volumetric media; and
  determining the portion of the point cloud video data associated with the first region of interest comprises determining a subset of data of the set of 2D planar video bit streams associated with the first region of interest.

3. The method of claim 1, further comprising:
  receiving user interaction data associated with the point cloud video data, wherein the user interaction data comprises data indicative of the user's location, the user's viewpoint, or some combination thereof;
  determining a second region of interest from the one or more regions of interest, wherein the second region of interest is different than the first region of interest;
  determining a second portion of the point cloud video data associated with the second region of interest, wherein the second portion is different than the portion associated with the first region of interest; and
  generating, based on the determined second portion of the point cloud video data associated with the second region of interest, second point cloud media for viewing by the user.

4. The method of claim 1, wherein:
  determining the first region of interest comprises determining a first identifier for a geometry track of the point cloud video data, a second identifier for a texture track of the point cloud video data, or both, wherein the geometry track specifies one or more geometric aspects of the point cloud video data, and the texture track specifies one or more texture aspects of the point cloud video data; and
  determining the portion of the point cloud video data associated with the first region of interest comprises selecting the geometry track identified by the first identifier, selecting the texture track identified by the second identifier, or both.

5. The method of claim 1,
  wherein the sample entry structure is a region structure associated with the point cloud video data that specifies one or more aspects of the first region of interest based on a sphere, wherein the one or more aspects comprise a location of the first region of interest, an orientation of the first region of interest, a shape of the first region of interest, a size range of the first region of interest, or some combination thereof, the region structure comprising:
  data indicative of whether the one or more aspects of the region structure comprises data indicative of one or more global aspects of the first region of interest that applies to each of a set of samples associated with the first region structure, including the dynamic location information for the location of the first region of interest, the dynamic size information for the size range of the first region of interest, or both; and
  determining the first region of interest in the point cloud video data based on the data indicative of whether the region structure comprises data indicative of the one or more global aspects of the first region of interest.

6. The method of claim 5, wherein determining the first region of interest in the point cloud video data based on the data indicative of whether the region structure comprises data indicative of one or more global aspects of the first region of interest comprises:
  determining that the region structure does not specify at least one global aspect of the one or more aspects; and
  determining, for each sample associated with the region structure, a sample-specific aspect for the sample for the first region of interest.

7. The method of claim 5, wherein determining the first region of interest in the point cloud video data comprises determining the location of the first region of interest by determining a center location of the first region of interest.

8. The method of claim 5, wherein determining the first region of interest in the point cloud video data comprises determining the orientation of the first region of interest by determining a center azimuth, a center elevation, and a center tilt of the first region of interest.

9. The method of claim 5, wherein determining the first region of interest in the point cloud video data comprises determining the size range of the first region of interest by determining an azimuth range and an elevation range of the first region of interest.

10. A method for encoding video data, the method comprising:
  encoding point cloud video data comprising:
    a plurality of media samples of the point cloud video data; and
    a sample entry structure comprising metadata specifying one or more regions of interest of the point cloud video data, wherein the sample entry structure includes one or more of:
      dynamic location information indicative of whether a location of the one or more regions change in samples of the plurality of media samples of the point cloud video data that refer to the sample entry structure; and
      dynamic size information indicative of whether a size of the one or more regions changes in the samples that refer to the sample entry structure,
  the encoding comprising:
    determining a first region of interest of the one or more regions of interest;
    determining a portion of the point cloud video data associated with the first region of interest, comprising determining at least one of the plurality of media samples of the point cloud video data references the sample entry structure; and
    encoding, based on the determined portion of the point cloud video data associated with the first region of interest, the point cloud video data comprising encoding the sample entry structure comprising metadata specifying the one or more regions of interest of the point cloud video data.

11. An apparatus configured to decode video data, the apparatus comprising a processor in communication with memory, the processor being configured to execute instructions stored in the memory that cause the processor to perform:
  receiving point cloud video data comprising:
    a plurality of media samples of the point cloud video data; and
    a sample entry structure comprising metadata specifying one or more regions of interest of the point cloud video data, wherein the sample entry structure includes one or more of:
      dynamic location information indicative of whether a location of the one or more regions change in samples of the plurality of media samples of the point cloud video data that refer to the sample entry structure; and
      dynamic size information indicative of whether a size of the one or more regions changes in the samples that refer to the sample entry structure;
  determining a first region of interest from the one or more regions of interest, comprising determining at least one of the plurality of media samples of the point cloud video data references the sample entry structure;
  determining a portion of the point cloud video data associated with the first region of interest; and
  generating, based on the determined portion of the point cloud video data associated with the first region of interest, point cloud media for viewing by a user.

12. The apparatus of claim 11, wherein:
  receiving the point cloud video data comprises receiving a set of two-dimensional (2D) planar video bit streams and second metadata specifying a conversion of the set of 2D planar video bit streams to 3D volumetric media; and
  determining the portion of the point cloud video data associated with the first region of interest comprises determining a subset of data of the set of 2D planar video bit streams associated with the first region of interest.

13. The apparatus of claim 11, wherein the instructions further cause the processor to perform:
  receiving user interaction data associated with the point cloud video data, wherein the user interaction data comprises data indicative of the user's location, the user's viewpoint, or some combination thereof;
  determining a second region of interest from the one or more regions of interest, wherein the second region of interest is different than the first region of interest;
  determining a second portion of the point cloud video data associated with the second region of interest, wherein the second portion is different than the portion associated with the first region of interest; and
  generating, based on the determined second portion of the point cloud video data associated with the second region of interest, second point cloud media for viewing by the user.

14. The apparatus of claim 11, wherein:
determining the first region of interest comprises determining a first identifier for a geometry track of the point cloud video data, a second identifier for a texture track of the point cloud video data, or both, wherein the geometry track specifies one or more geometric aspects of the point cloud video data, and the texture track specifies one or more texture aspects of the point cloud video data; and
determining the portion of the point cloud video data associated with the first region of interest comprises selecting the geometry track identified by the first identifier, selecting the texture track identified by the second identifier, or both.

15. The apparatus of claim 11, wherein:
wherein the sample entry structure is a region structure associated with the point cloud video data that specifies one or more aspects of the first region of interest based on a sphere, wherein the one or more aspects comprise a location of the first region of interest, an orientation of the first region of interest, a shape of the first region of interest, a size range of the first region of interest, or some combination thereof, the region structure comprising:
data indicative of whether the one or more aspects of the region structure comprises data indicative of one or more global aspects of the first region of interest that applies to each of a set of samples associated with the region structure, including the dynamic location information for the location of the first region of interest, the dynamic size information for the size range of the first region of interest, or both; and
determining the first region of interest in the point cloud video data based on the data indicative of whether the region structure comprises data indicative of the one or more global aspects of the first region of interest.

16. The apparatus of claim 15, wherein determining the first region of interest in the point cloud video data based on the data indicative of whether the region structure comprises data indicative of one or more global aspects of the first region of interest comprises:
determining that the region structure does not specify at least one global aspect of the one or more aspects; and
determining, for each sample associated with the region structure, a sample-specific aspect for the sample for the first region of interest.

17. The apparatus of claim 15, wherein determining the first region of interest in the point cloud video data comprises determining the location of the first region of interest by determining a center location of the first region of interest.

18. The apparatus of claim 15, wherein determining the first region of interest in the point cloud video data comprises determining the orientation of the first region of interest by determining a center azimuth, a center elevation, and a center tilt of the first region of interest.

19. The apparatus of claim 15, wherein determining the first region of interest in the point cloud video data comprises determining the size range of the first region of interest by determining an azimuth range and an elevation range of the first region of interest.

* * * * *